US00RE41417E

(19) United States
(12) Reissued Patent
Russell et al.

(10) Patent Number: US RE41,417 E
(45) Date of Reissued Patent: Jul. 6, 2010

(54) CONCATENATION OF CONTAINERS IN SYNCHRONOUS DIGITAL HIERARCHY NETWORK

(75) Inventors: John Paul Russell, Sawbridgeworth (GB); Christopher David Murton, Chelmsford (GB); David Michael Goodman, St. Albans (GB); Christopher Thomas William Ramsden, Hertford (GB); James Shields, Ottawa (CA)

(73) Assignee: Nortel Networks Limited, St. Laurent, Quebec (CA)

(21) Appl. No.: 11/257,483

(22) Filed: Oct. 24, 2005

Related U.S. Patent Documents

Reissue of:
(64) Patent No.: 6,917,630
Issued: Jul. 12, 2005
Appl. No.: 09/166,814
Filed: Oct. 6, 1998

(51) Int. Cl.
*H04J 3/04* (2006.01)

(52) U.S. Cl. ..... 370/532; 370/474
(58) Field of Classification Search ..... None
See application file for complete search history.

(56) References Cited

U.S. PATENT DOCUMENTS

| | | | | | |
|---|---|---|---|---|---|
| 5,065,396 | A | * | 11/1991 | Castellano et al. | 370/536 |
| 5,461,622 | A | * | 10/1995 | Bleickardt et al. | 370/470 |
| 5,581,566 | A | | 12/1996 | St. John et al. | |
| 5,666,351 | A | | 9/1997 | Oksanen et al. | |
| 5,675,585 | A | | 10/1997 | Bonnot et al. | |
| 5,706,285 | A | * | 1/1998 | Saijonmaa et al. | 370/230.1 |
| 5,757,804 | A | | 5/1998 | McGee | |
| 5,978,377 | A | | 11/1999 | Kim et al. | |
| 6,058,119 | A | | 5/2000 | Engbersen et al. | |
| 6,094,442 | A | * | 7/2000 | Okamoto et al. | 370/506 |
| 6,094,737 | A | * | 7/2000 | Fukasawa | 714/738 |
| 6,112,236 | A | * | 8/2000 | Dollin et al. | 709/224 |
| 6,134,217 | A | * | 10/2000 | Stiliadis et al. | 370/232 |
| 6,266,345 | B1 | | 7/2001 | Huang | |
| 6,556,593 | B1 | | 4/2003 | Herkersdorf et al. | |

FOREIGN PATENT DOCUMENTS

| | | |
|---|---|---|
| EP | 0 773 645 | 5/1997 |
| EP | 0 901 306 | 3/1999 |
| WO | 97/33398 | 9/1997 |
| WO | 98/04072 | 1/1998 |

OTHER PUBLICATIONS

XP 10208008 "Reducing ATM Cell Processing in SDH Multiplexers" Dr. Gerard Parr & Dr. Stephen Wright.
XP 000371210 Yukio Nakano et al "Signal Processing for SDH Digital Cross–Connect System".
XP 000010469 Flanagan T et al "Transporting New High–Speed Services in Access Networks".

* cited by examiner

*Primary Examiner*—Phuc H Tran
(74) *Attorney, Agent, or Firm*—Barnes & Thornburg LLP

(57) ABSTRACT

A method of transmitting OSI layer 2 datacoms data by direct incorporation into a plurality of synchronous digital hierarchy virtual containers is disclosed, in which a higher bit rate OSI layer 2 data frame is multiplexed into a plurality of lower bit rate SDH (or SONET) virtual containers, which are transmitted simultaneously and in parallel over a synchronous communications network. The plurality of virtual containers are virtually concatenated by association of the payloads of the plurality of virtual containers. Re-assembly of the OSI layer 2 data frames from a plurality of virtually concatenated VCs is achieved by storing each received VC payload corresponding to an OSI layer 2 data frame in a corresponding respective memory location, and alternately reading interleaved bytes from the plurality of payloads under control of a plurality of read pointers.

35 Claims, 15 Drawing Sheets

CONCATENATION OF CONTAINERS IN SYNCHRONOUS DIGITAL HIERARCHY NETWORK

Matter enclosed in heavy brackets [ ] appears in the original patent but forms no part of this reissue specification; matter printed in italics indicates the additions made by reissue.

FIELD OF THE INVENTION

The present invention relates to containers in a synchronous digital network, and particularly, although not exclusively, to a synchronous digital hierarchy (SDH) network or a synchronous optical network (SONET).

BACKGROUND TO THE INVENTION

Historically, the telecommunications industry has developed separately and largely independently from the computing industry. Conventional telecommunications systems are characterized by having high reliability circuit switched networks for communicating over long distances, whereas data communications between communicating computers is largely based upon shared access packet communications.

Datacoms may operate over a local area, to form a local area network (LAN) or over a wide area to form a wide area network (WAN). Historically the difference between a LAN and a WAN is one of geographical coverage. A LAN may cover communicating computing devices distributed over an area of kilometers or tens of kilometers, whereas a WAN may encompass communicating computing devices distributed over a wider geographical area, of the order of hundreds of kilometers or greater.

However, the historical distinction between local area networks and wide area networks is becoming increasingly blurred.

Conventional local area networks are generally taken to be digital data networks operating at rates in excess of 1 MBits/s over distances of from a few meters up to several kilometers. Conventional local area networks are almost universally serial systems, in which both data and control functions are carried through the same channel or medium. Local area networks are primarily data transmission systems intended to link computer devices and associated devices within a restricted geographical area. However, many local area networks include speech transmission as a service. A plurality of computer and associated devices linked together in a LAN may range from anything from a full-scale mainframe computing system to a collection of small personal computers. Since a local area network is confined to a restricted geographical area, it is possible to employ vastly different transmission methods from those commonly used in telecommunications systems. Local area networks are usually specific to a particular organization which owns them and can be completely independent of the constraints imposed by public telephone authorities, the ITU, and other public services. Local area networks are characterized by comprising inexpensive line driving equipment rather than the relatively complex modems needed for public analog networks. High data transmission rates are achieved by utilizing the advantages of short distance.

On the other hand, conventional wide area networks operate in general on a greater scale than local area networks. A wide area network is generally employed whenever information in electronic form on cables leaves a site, even for short distances. Wide area networks are generally carried over public telecommunications networks.

Because conventional telecoms systems have developed in parallel with conventional datacoms systems, there is a significant mis-match in data rates between conventional datacoms protocols as used in LANs and WANs, and conventional telecoms protocols. In general, telecoms operators provide equipment having standard telecoms interfaces, for example E1, T1, E3, T3, STM-1, which are used by the datacoms industry to provide wide area network point to point links. However, this is inconvenient for datacoms providers since datacoms protocols have developed using a completely different set of interfaces and protocols, for example carrier sense multiple access collision detection CSMA/(CD systems, subject of IEEE standard 802.3, and Ethernet which is available in 10 MBits/s, 100 MBits/s and 1 GigaBits/s versions. Conventional datacoms protocols do not match up very well to conventional telecoms interfaces, for example E1, E3, T1, STM-1 data rates, because of a mis-match in data rates and technologies between conventional datacoms and conventional telecoms.

In order to provide transport of OSI layer 2 datacoms traffic cover a wide area in an efficient manner, the inventors have previously disclosed transport of OSI layer 2 data frames over synchronous digital hierarchy networks (including SONET).

In the applicant's co-pending US patent application entitled "Frame Based Data Transmission over Synchronous Digital Hierarchy Network", a copy of which is filed herewith, there is disclosed a method of carrying OSI layer 2 frame based data, for example IEEE standard 802.3 carrier sense multiple access/collision detection (CSMA/CD) local area network packets, Ethernet packets, conventional token ring packets, conventional token bus packets, and fiber distributed data interface (FDDI) packets directly over a synchronous digital network. Such disclosed system may provide OSI layer 2 switching functionality such as was previously available in prior art local area networks, but extended over a wider geographical coverage area which has been historically considered to have been provided only by prior art wide area networks.

In the applicant's co-pending US patent application entitled "payload Mapping in Synchronous Networks", a copy of which is filed herewith, there is disclosed a method and apparatus for containment of OSI layer 2 frame based data into a set of synchronous digital hierarchy (SDH) virtual containers, by rate adapting a plurality of OSI layer 2 data frames by invoking buffering and flow control in a rate adaption means, and mapping the rate adapted OSI 2 data frames directly into a plurality of SDH virtual containers. This process enables a virtual OSI 2 local area network to be constructed across a wide area network supported by a synchronous digital transport layer.

Since data rates used by conventional OSI layer 2 datacoms systems are either higher than data rates of individual virtual containers in SDH systems or fit inefficiently into available faster virtual containers, there is the problem of how to carry higher bit rate OSI layer 2 datacoms traffic in SDH virtual containers, to achieve the result of an OSI layer 2 channel carried over an SDH network.

SUMMARY OF THE INVENTION

An object of the present invention is to provide a synchronous digital container system within the confines of ITU-T recommendation G.70X which provides high efficiency and minimum delay for transport of frame based data packets directly over a synchronous digital network without further encapsulation in intermediate protocol layers.

A further object of the present invention is to provide an SDH frame structure suitable for transmitting and receiving frame based data in a manner which overcomes variations in delay between different paths across a synchronous network.

Specific implementations of the present invention aim to provide a method and apparatus for virtual concatenation of VC-3s, and VC-12s in a form which is suitable for carrying frame based data. In this specification, the term "virtual concatenation" is used where the underlying network is unaware of any special relationship between the virtual containers which make up a group of virtually concatenated virtual containers. Particularly, although not exclusively, such frame based data may comprise OSI layer 2 data frames.

According to one aspect of the present invention there is provided a method of transporting data over a synchronous digital network, said method comprising the steps of: generating in parallel a plurality of synchronous virtual containers, each at a lower bit rate than a bit rate of said data, each said virtual container having a payload section; associating said plurality of virtual containers with each other by means of assigning association data describing said association into said plurality of virtual containers; inputting said transported data into said payloads of said plurality of virtual containers; and outputting said plurality of associated virtual containers onto a synchronous digital network.

Preferably said plurality of associated virtual containers are output onto said synchronous digital network substantially in parallel. Said step of associating said plurality of virtual containers with each other preferably comprises inserting said association data into a plurality of payloads of said plurality of virtual containers, said association data permitting recovery of the original association at a destination end. Preferably said step of inputting said transported data into said plurality of virtual containers comprises byte interleaving bytes of a frame of said transported data between said plurality of payloads. Preferably said plurality of virtual containers are generated as a plurality of streams of virtual containers and said step of associating said plurality of virtual containers with each other comprises associating a plurality of said streams of virtual containers with each other.

Preferably said step of associating said plurality of virtual containers together by means of assigning association data comprises adding a stream of identification data to each said virtual container, said stream identification data identifying which of said plurality of streams said virtual container belongs to. The method preferably comprises including a sequence identification data to individual ones of said plurality of virtual containers, said sequence identification data designating a sequence in which said individual virtual containers are generated with respect to each other. Suitably the sequence identification data comprising a cyclically repeating code data. In the best mode, there is assigned to individual ones of said plurality of virtual containers a cyclically repeating code sequence having a repetition period of at least 2 N+1, where N is the number of sequentially received virtual container payloads in a single stream.

Alternatively, said step of associating said plurality of virtual containers together by means of assigning association data comprises utilizing a path trace byte in a virtual container overhead as a stream identifier data for identifying a virtual container as belonging to a particular said virtual container stream. Instead of including sequence identification data in the virtual container payload, said sequence identification data may be carried within a K3 byte of an overhead section of said virtual container. A sequence identification code data may extend over a plurality of said virtual containers of a said steam, for identifying a position of each said virtual container comprising said virtual container stream.

The invention includes an apparatus for incorporating data input at a first data rate into a plurality of streams of synchronous digital hierarchy virtual containers each output at a second data rate, said apparatus comprising: means for continuously generating a plurality of virtual containers in parallel; means for generating data describing an association of said plurality of virtual containers, and for assigning said association data to said plurality of associated virtual containers; and means for inserting said first data rate data into said plurality of payloads of said plurality of virtual containers.

According to a second aspect of the present invention there is provided a method of recovering data from a plurality of synchronous virtual containers, said method comprising the steps of: receiving said plurality of virtual containers; identifying an association data from said plurality of virtual containers, said association data indicating an association between individual ones of said plurality of virtual containers; reading data bytes from each payload of said plurality of associated virtual containers; and reassembling said data from said plurality of read payload data bytes.

Preferably said process of reading said data payloads comprises reading a plurality of said payloads in a byte interleaved manner. Preferably said step of identifying an association data from each of said plurality of virtual containers comprises reading a plurality of stream identification data from said plurality of virtual containers, said stream identification data designating which of a plurality of streams of virtual containers said virtual containers belong to. Preferably said step of identifying an association data between said plurality of virtual containers comprises reading a plurality of sequence identification data designating where in a sequence of virtual containers each individual virtual container belongs. A plurality of separate streams of associated virtual containers may be received simultaneously. Said step of reading data bytes from each payload of said plurality of associated virtual containers may comprise reading said data bytes substantially in parallel from a plurality of virtual containers of a same sequence identification from a plurality of associated virtual container streams. Where the association data are not carried in a virtual container payload section, said step of identifying an association data from said plurality of virtual containers may comprise inspecting a path trace byte of each of a plurality of said virtual containers, and distinguishing from which of a set of said stream of virtual containers said individual virtual containers belong, from said read path trace data bytes. A sequence identification data designating where in a stream of said virtual containers, a said virtual container belongs, may be read from a K3 byte of a said virtual container.

The invention includes a method of recovering data carried in payloads of a plurality of associated synchronous digital hierarchy virtual containers, said method comprising the steps of: for each said virtual container: reading data indicating an association between said virtual container and other ones of said plurality of virtual containers; allocating a memory storage area for storing a payload of said virtual container, inputting said virtual container payload into said memory area; and reading said data from said memory area in parallel with data read from other said memory areas corresponding to payloads of other said virtual containers of said plurality of virtual containers.

Said step of, for each virtual container, reading data in parallel with data of other virtual containers may comprise:

for each said memory area, setting a read pointer to a memory location of said memory area; wherein said plurality of read pointers are set to said memory locations such that successive bytes of said data frame are read from said plurality of memory locations in sequence. A said data frame may be assembled from said parallel read data. A said data frame comprises an OSI layer 2 data frame. The invention includes a method of recovering a data block carried in a plurality of payloads of a plurality of associated synchronous digital hierarchy virtual containers, said method comprising steps of: receiving a plurality of streams of said plurality of associated virtual containers; for each said received virtual container stream allocating a corresponding respective memory area for storage of data payloads of virtual containers of said stream; storing said plurality of virtual container payloads in said corresponding allocated memory areas; and reading individual bytes of said plurality of stored virtual container data payloads in sequence to reconstruct said data block.

Preferably said step of reading individual bytes of said plurality of payloads comprises: for each said memory area, setting a read pointer to a memory location corresponding to a next data byte of said data block to be read, contained within that data payload; and reading said data byte once a preceding data byte of said data block has been read from a memory location of another said memory area. Said bytes are preferably read from each of a plurality of said memory areas in which said virtual container payloads are stored.

The invention includes apparatus for recovering data from a plurality of synchronous digital hierarchy virtual containers containing said data, said means comprising: a random access memory configured into a plurality of individual memory areas allocated for storage of payloads of said plurality of virtual containers; a data processor means operating to identify an association data of said virtual containers, said association data indicating an association of said plurality of virtual containers; and means for generating a plurality of read pointers operating to successively read a plurality of memory locations of said memory areas for recovering said data from said plurality of virtual containers.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

In the following description there is used an example of a stream of OSI layer 2 data frames being transported over a plurality of streams of virtual containers as an example of the payload carried by a plurality of virtual concatenated virtual containers. However, it will be understood by a person skilled in the art that any data payload can be carried by a plurality of virtually concatenated virtual containers, and the advantages of the invention are most apparent for a data payload which has a data rate which is too fast to be carried in a nearest data rate virtual container (eg data 5% or more faster than a nearest equivalent virtual container data rate under ITU-T recommendation G.707), but which inefficiently fills a next higher up data rate virtual container (eg the data rate of the transported data is 30% or more slower than the higher data rate of the next available virtual container in which it could be carried).

Figure 1:
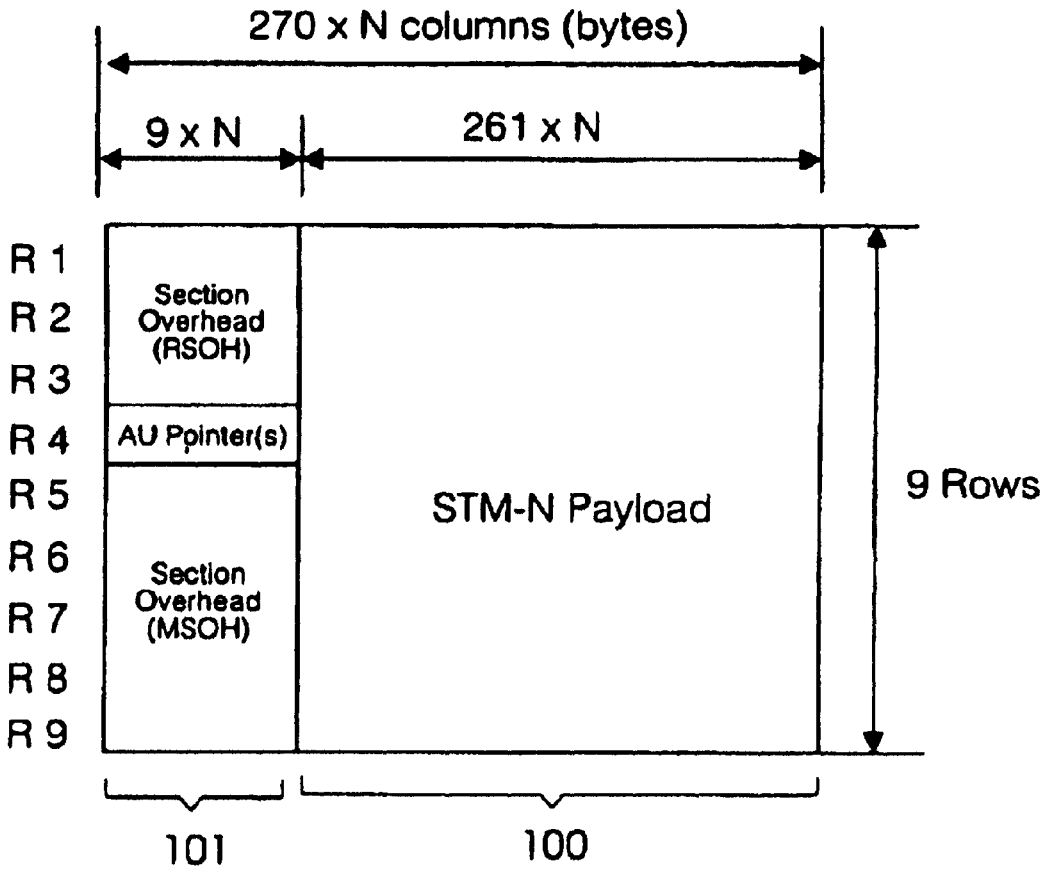
Fig. 1 (Prior Art)
FIG. 1 illustrates schematically a prior art synchronous digital hierarchy STM-N frame.
Figure 2:
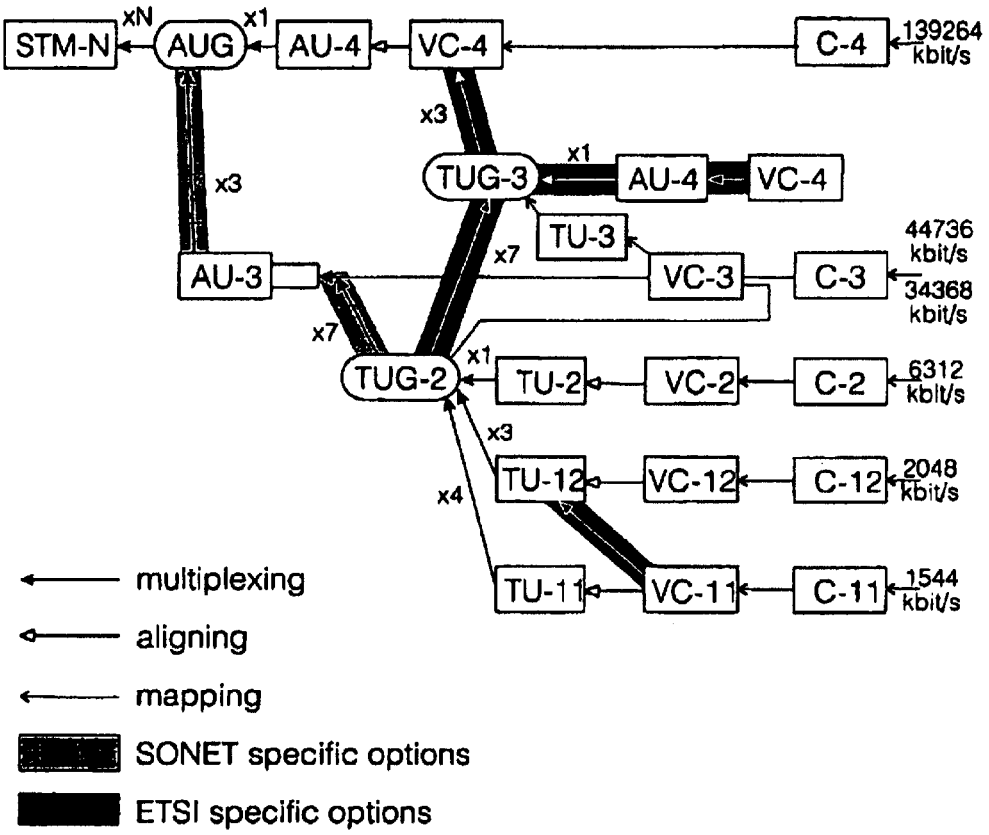
Fig. 2 (Prior Art)
FIG. 2 illustrates schematically the prior art SDH multiplexing hierarchy.

Referring to FIG. 1 herein, there is illustrated schematically a prior art synchronous digital hierarchy (SDH) synchronous transfer mode frame. The STM frame has a duration of 125 μs, and comprises a string of serially transmitted data bytes, which can be drawn schematically in two dimensions as a (270×N) column×9 row byte array as shown in FIG. 1 herein. Within the basic STM-N frame structure, a first 9 columns of the frame comprise a "section overhead" area 100, and the remaining 261 columns comprise payload area 101, in which data is carried. The STM-N frame forms the basis of the SDH multiplexing scheme as specified in ITU-T recommendation G.70X, which incorporates a set of different multiplexed data rates in the range 1.544 MBits/s to 622 Mbits/s and above, the lower bit rates being multiplexed to higher bit rates according to the SDH hierarchy as shown schematically in FIG. 2 herein, as is well-known to those skilled in the art. In this specification, references to synchronous digital hierarchy multiplexing includes the synchronous optical network (SONET) options, as will be understood by those skilled in the art, and SONET options may be referred to in parentheses after description of SDH features.

At each level of the SDH multiplex hierarchy, data is carried in the STM-N payload section 101 of the STM-N frame. For example, the basic transmission rate defined in the SDH standards for an STM-1 frame is 155.520 MBits/s. The STM-1 frame consists of 2,430 8 bit bytes which corresponds to a frame duration of 125 μs. Three higher bit rates are also defined: 622.08 Mbits/s (STM-4), 2488.32 Mbits/s (STM-16) and 9,953.28 MBits/s (STM-64). The higher bit rates are achieved by interleaving on a byte by byte basis a number N of the basic STM-1 frames.

The 2,430 byte payload section of an STM-1 frame, carries a plurality of virtual containers (VCs). Each virtual container comprises a plurality of data bytes divided into a path overhead component and a payload component. Various types of virtual container are defined in ITU-T recommendation G.70X, including VC-1, VC-2, VC-3, VC-4, VC-12. For VC-1 and VC-2, the path overhead bits comprise bits which are used for error performance monitoring and network integrity checking.

A VC-3 comprises an 85 byte column×9 row byte structure. For the VC-3 container, the path overhead component is located in a first column of the 9 row×85 column structure and includes bytes which verify a VC-3 path connection; a byte which provides bit error monitoring, a signal label byte indicating a composition of the VC-3 payload; a path status byte allowing the status of a received signal to be returned to a transmitting end; a plurality of path user channel bytes to provide a user specified communication channel; a position indicator byte for providing a generalized position indicator for payloads; an automatic protection switching byte; a national operator byte which is allocated for specific management purposes such as tandem connection maintenance; and a plurality of spare bytes.

A VC-4 container comprises a 261 byte column×9 byte row structure, having similar path overhead byte functions as for a VC-3 container as described above.

A plurality of virtual containers are incorporated into an STM-1 frame as follows. Firstly, the virtual container is positioned in a tributary unit (TU), or an administrative unit (AU) with a pointer indicating the start of the virtual container relative to the tributary unit or administrative unit as appropriate. VC-1s and VC-2s are always positioned in tributary units, whereas VC-4s are always positioned in an AU4 administrative unit. Tributary units and administrative units are each bundled into their respective groups: tributary unit groups (TUGS) for tributary units, and administrative unit groups (AUGs) for administrative units. Tributary unit groups are multiplexed into higher order virtual containers which in turn are positioned in administrative units with a pointer indicating the start of the virtual container relative to the administrative unit. Administrative unit pointers indicate the position of the administrative units in relation to the STM-1 frame, and form part of the section overhead area of the frame.

Figure 3:
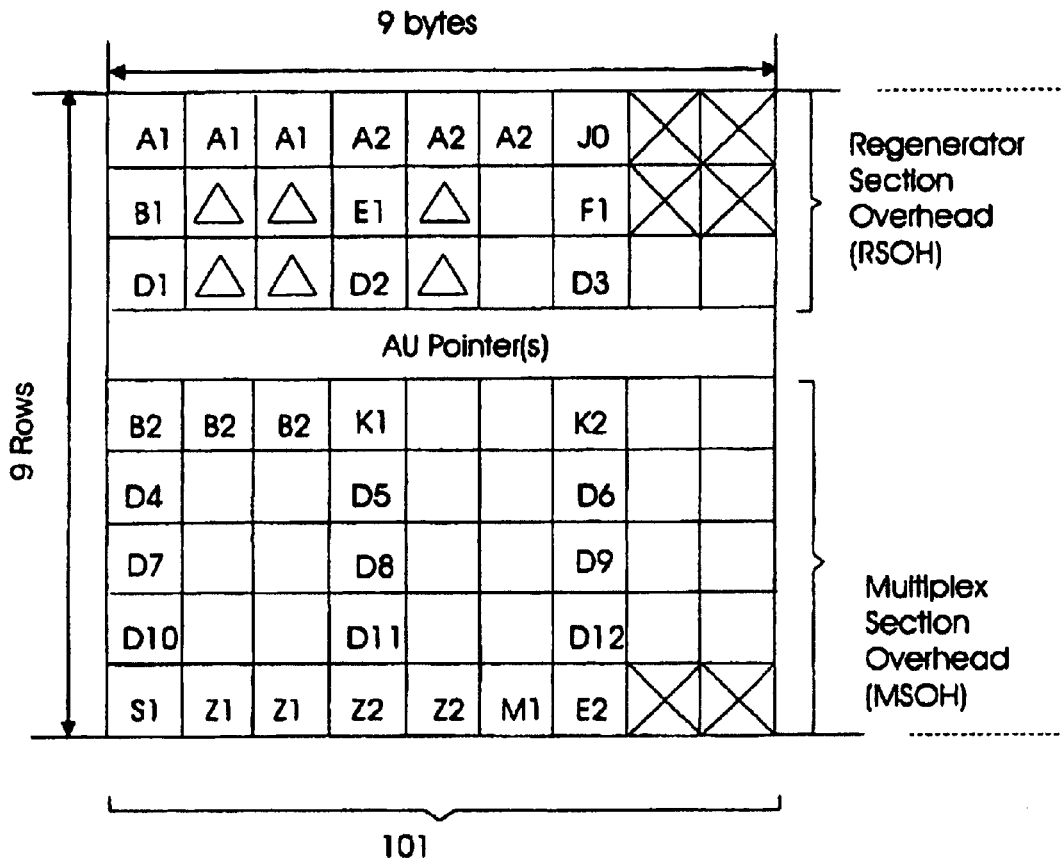
Fig. 3 (Prior Art)
FIG. 3 illustrates schematically details of a regenerator section overhead, a multiplex section overhead, and a plurality of administrative unit (AU) pointers comprising a header of the STM-N frame of FIG. 1 herein.

Referring to FIG. 3 herein, there is illustrated schematically in more detail the 9 byte column×9 row STM-1 section overhead of an STM-1 frame, showing the position at which AU pointers for the VCs which comprises the payload of the STM-1 frame are positioned within the STM-1 frame.

A system for sending and recovering frame data over an SDH network according to the best mode implementation of the present invention will now be described.

Figure 4:
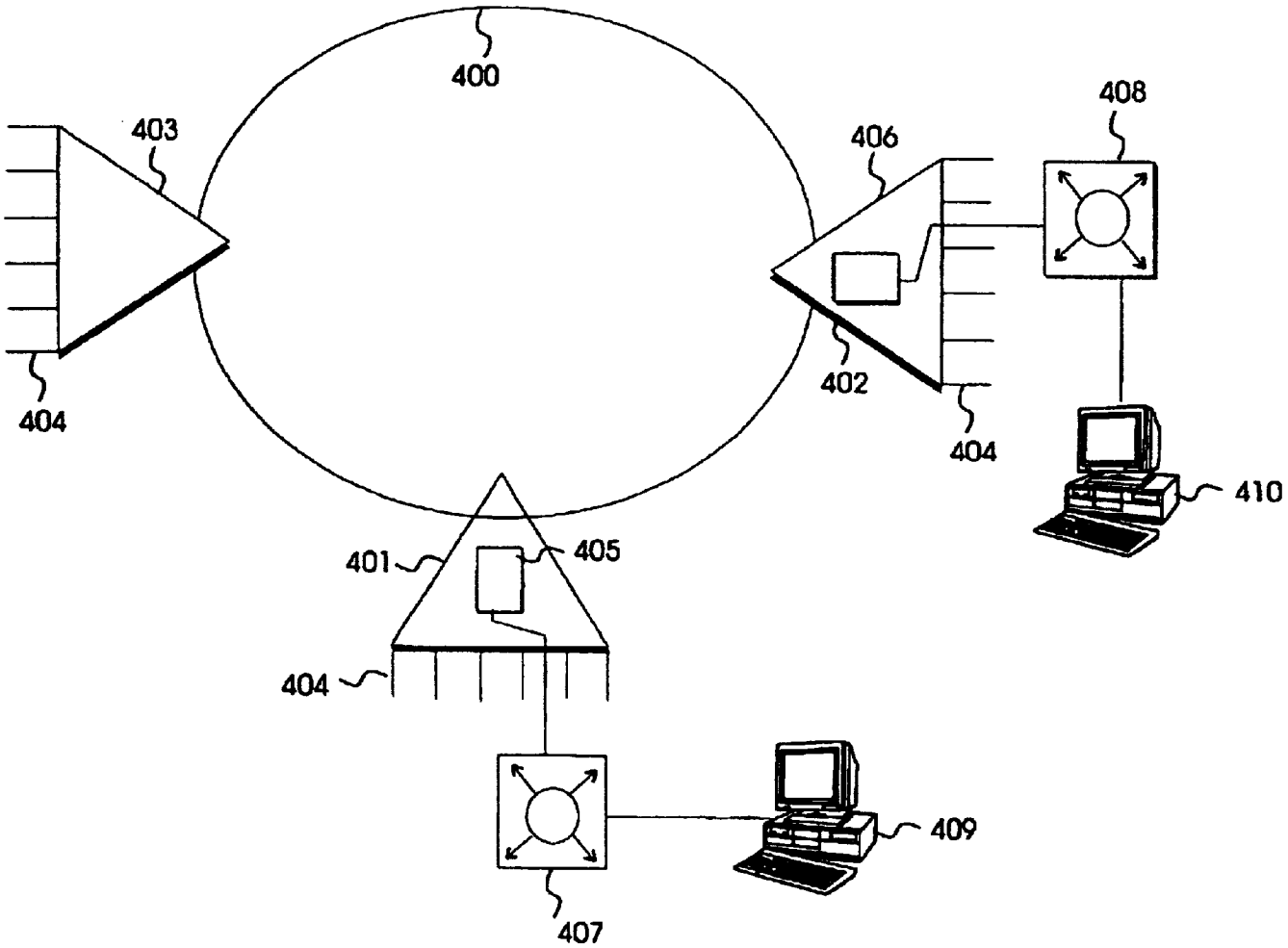
FIG. 4 illustrates schematically a section of a synchronous network over which is carried an OSI layer 2 datacoms channel between first and second computing devices.

Referring to FIG. 4 herein, there is illustrated schematically a section of a synchronous digital hierarchy (SDH) network comprising: an STM-fiber ring 400 connecting a plurality of add-drop multiplexers 401–403, each multiplexer having a plurality of telecoms tributaries 404, for example E1 tributaries operating at 2 MBits/s; first and second multiplexers 401, 402 respectively at first and second locations A, B, each comprise a corresponding respective first or second OSI layer 2 datacoms port card 405, 406; first and second datacoms routers 407, 408 connected to said respective first and second datacoms port cards 405, 406 of the first and second multiplexers; and communicating with the datacoms routers, a plurality of computing devices, for example personal computers, mini computers etc, 409, 410.

The embodiment of FIG. 4 herein illustrates schematically an OSI layer 2 datacoms channel carried over a synchronous digital hierarchy ITU-T recommendation G.701 type network between first and second locations A, B. First and second datacoms routers and first and second synchronous multiplexers may be located at, for example, a pair of geographically separated customer premises, thereby providing an OSI layer 2 data channel over a relatively wide area. The implementation of FIG. 4 may provide a functionality equivalent to what has historically in the prior art been regarded as local area network, ie OSI layer 2 datacoms system data rates and reliability, but over a geographical area which has historically been considered to be provided by a wide area network, ie over a range of from the order of a few kilometers to thousands of kilometers.

Datacoms frame based data is incorporated into synchronous virtual containers by the datacoms port cards of the synchronous multiplexers. The datacoms port cards are not restricted to inclusion in add-drop multiplexers, but may be incorporated in any synchronous digital multiplexer, for example an SDH terminal multiplexer.

Figure 5:
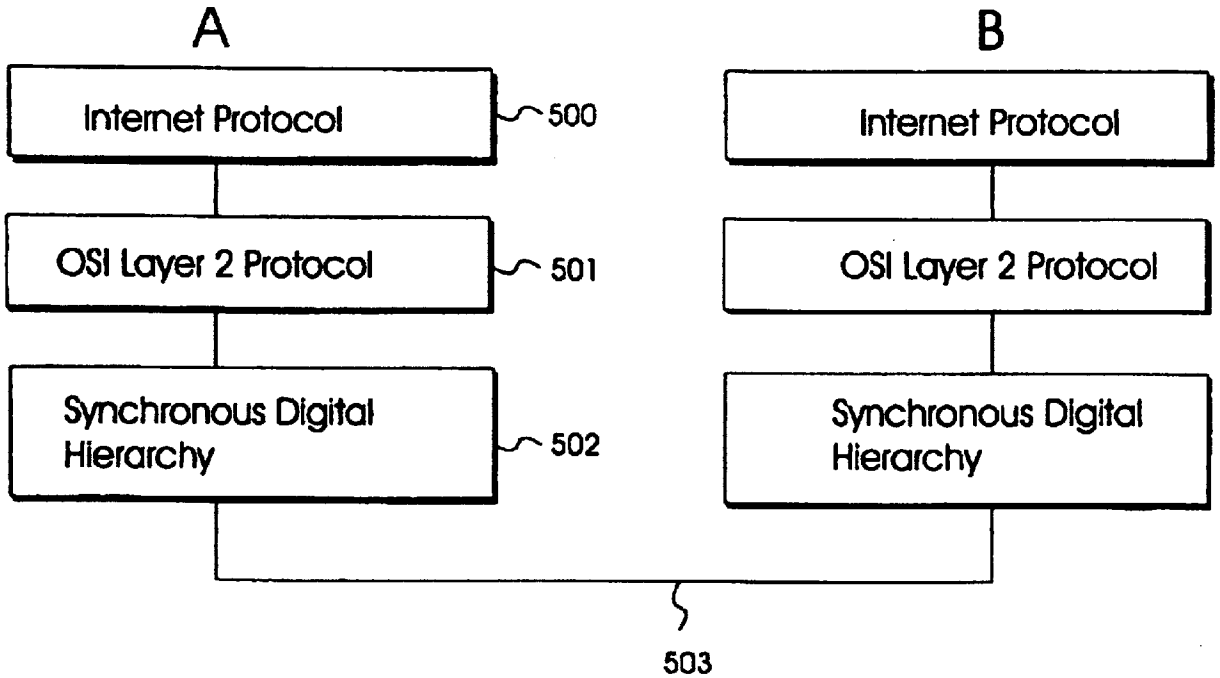
FIG. 5 illustrates schematically a protocol stack for carrying an OSI layer 2 data channel over a synchronous digital network.

Referring to FIG. 5 herein, there is illustrated schematically protocol stacks operating within the computing devices 409, 410, first and second datacoms routers 407, 408, first and second datacoms port cards 405, 406 and first and second multiplexers 401, 402 at first and second locations A, B. Internet protocol packets in Internet protocol layer 500 are entered into OSI layer 2 datacoms data frames in OSI layer 2 protocol 501, as is conventionally known in the art. OSI layer 2 datacoms carried IP packets are incorporated into SDH virtual containers in SDH protocol layer 502 at the port cards, and are carried across SDH channel 503. De-layering of the virtual containers occurs by traversing the protocol stacks in an opposite direction.

By incorporating OSI layer 2 data frames directly into synchronous digital hierarchy ITU-T recommendation G.701 channels, the high data rates available using OSI layer 2 frames can be provided in a geographically widespread system, which is unlimited by the conventional distance limitations imposed on prior art local area network systems.

However, there exists the practical problem of how to incorporate and extract OSI layer 2 data frames, which are generated at a first set of bit rates with SDH virtual containers which are defined to operate at a second set of bit rates. Table 1 herein illustrates a comparison of Ethernet data rates (in a left column of Table 1) as an example of OSI layer 2 data rates, with nearest available SDH virtual container rates (in the central column of Table 1), and how the Ethernet data rates can be accommodated in a plurality of SDH virtual containers (in the right column of table 1). In general, the Ethernet data rates at higher bit rates than the nearest available bit rate virtual containers. However, the prior art Ethernet data rates are well matched to integer multiples of the synchronous digital hierarchy virtual container payload data rates, as illustrated in Table 1. The SDH payload data rates have a granularity of a minimum incremental step of ~2 MBits/s. A minimum granularity of Ethernet rates is 10 MBits/s, and so 5 SDH VC-12 containers each of 2 MBits/s can accommodate neatly a single 10 MBits/s Ethernet channel. Similarly, a 100 MBits/s Ethernet data rate can be accommodated in 2 VC-3 containers, each of approximately 50 MBits/s.

TABLE 1

| Ethernet | Virtual Containers | Multiple Virtual Containers |
|---|---|---|
| 10 MBits/s | VC-12 (~2 MBits/s) | 1-5 × VC-12 (2 MBits/s-10 MBits/s) |
| 10 MBits/s | VT | 1-8 × VT 1-5 (2 MBits/s-10 MBits/s |
| 100 MBits/s | VC-3 (~50 MBits/s) | 1-2 × VC-3 (50 MBits/s-100 MBits/s) |
| 100 MBits/s | STS-1 | 1-2 × STS-1 (50 MBits/s-100 MBits/s) |
| 1 Gbits/s | VC-4 (~155 MBits/s) | N × VC-4 (155 MBits/s-1.2 GBits/s) |
| | VC-4-4c (622 MBits/s) | N = 1-8 |
| 1 Gbits/s | | N × STS-1 (155 MBits/s-1.2 GBits/s) |
| | | N = 3, 6, 9 12, 15, 18, 21, 24 |

Figure 6:
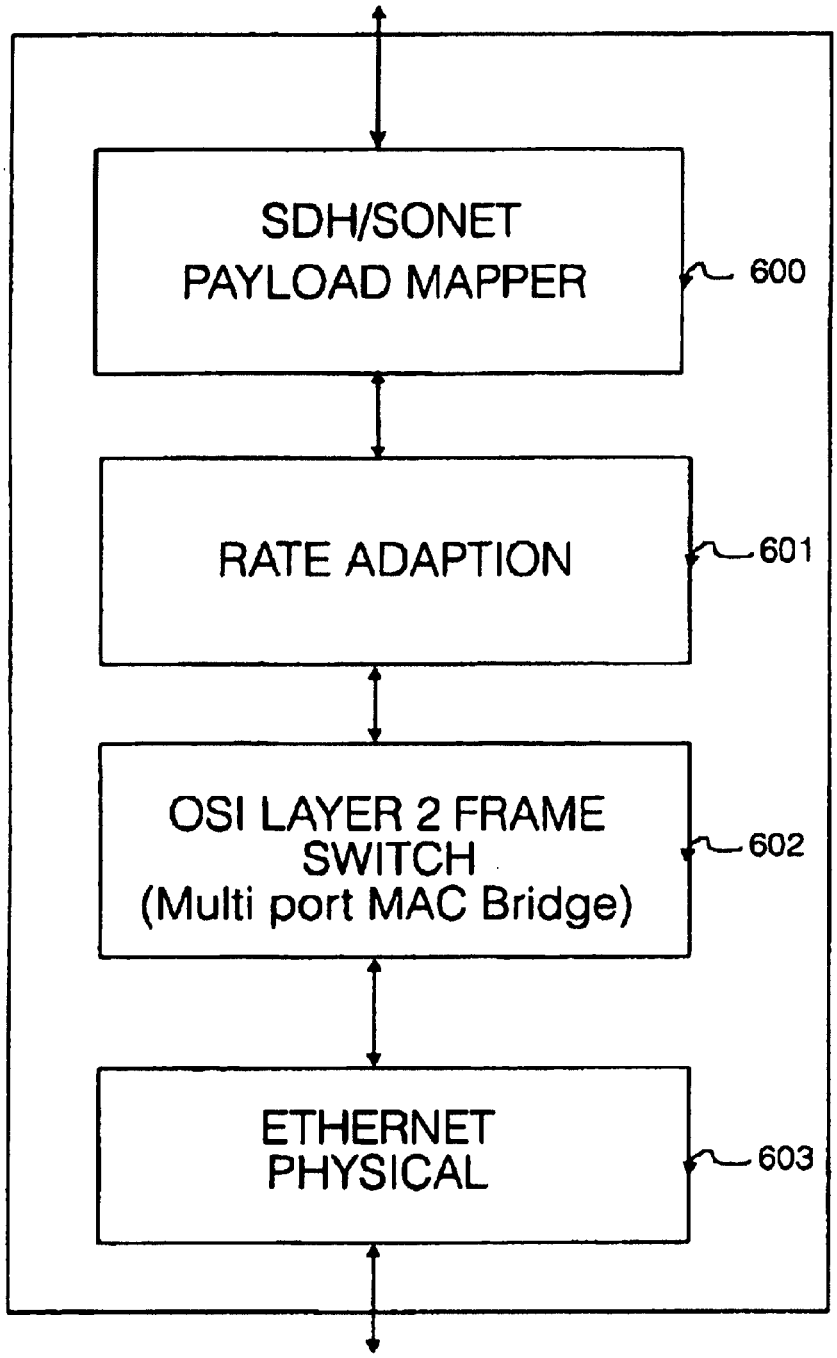
FIG. 6 illustrates schematically an OSI layer 2 port card for interfacing between OSI layer 2 apparatus and synchronous digital network elements.

Referring to FIG. 6 herein, there is illustrated schematically components of an OSI layer 2 datacoms port card comprising a synchronous digital multiplexer. The datacoms port card is incorporated into a synchronous digital hierarchy multiplexer (or a SONET multiplexer), so that as well as having a plurality of tributary interfaces for telecoms channels, for example E1, T1, STM-1, the multiplexer also has an interface for frame based data systems, as illustrated in FIG. 6 herein.

The datacoms port card of FIG. 6 herein comprises a conventional OSI layer 2 datacoms physical port 603, the datacoms physical port communicating with a router ot a datacoms OSI layer 2 frame switch 602 (eg a conventional Ethernet frame switch, such as available from Plaintree, MMC) or directly with a computer; a rate adaption means 601 for adapting between OSI layer 2 datacoms rates and SDH rates equivalent to the rates of the virtual containers; and an SDH payload mapper 600 for mapping datacoms frames into one or more SDH payloads. Rate adaption means 601 and SDH payload mapper 600 may be implemented as a field programmable gate array (FPGA) or an application specific integrated circuit (ASIC).

Rate adaption means 601 comprises an OSI layer 2 datacoms port, eg operating at 10 MBits/s or 100 MBits/s in accordance with IEEE standard 802.3; and a synchronous port operating at 2 MBits/s, 50 MBits/s or 100 MBits/s communicating with SDH payload mapper 600. Rate adaption means 601 comprises a through channel for adapting OSI layer 2 data frames into bitstreams having an appropriate data rate of 2 MBits/s, 50 MBits/s or 100 MBits/s.

The function of the rate adaption means is to handle the frequency difference between an exact data rate at the OSI layer 2 port and an approximate rate achieved over a plurality N of virtual containers.

SDH payload mapper 600 maps OSI layer 2 datacoms data frames directly into SDH data frames.

Further details of construction and operation of payload mapper 600 will now be described.

The datacoms port card of FIG. 6 herein adapts the OSI layer 2 datacoms data frames to a data rate which matches a data rate which can be multiplexed into a virtual container, and maps each OSI layer 2 data frame into one or more SDH virtual containers directly and without any further encapsulation in intermediate protocols. For example, a 10 MBits/s Ethernet channel may be mapped onto 5 VC-12 containers, each VC-12 container having a data rate of ~2 MBits/s. The 5 VC-12 containers are concatenated together to carry the 10 MBits/s Ethernet channel. For entry of a 100 MBits/s Ethernet channel into the synchronous network, a single 100 MBits/s Ethernet channel may be mapped into 2 concatenated VC-3 containers each having a capacity of ~50 MBits/s. To carry an Ethernet 1 GBits/s channel over a synchronous network, the Ethernet channel may be mapped into 7 VC-4 containers, each having a capacity of ~155 MBits/s.

A method and apparatus for directly mapping frame based data as described above, directly into synchronous digital virtual containers, is described in the applicant's co-pending US patent application reference ID 0889 filed contemporaneously with the present application, and entitled "Payload Mapping in Synchronous Networks". Data frames are mapped into SDH VCs without encapsulation in an intermediate protocol, in a manner in which data frames carried within synchronous digital frames are identifiable as such, through provision of start and/or boundary markers delineating data frame packets contained within synchronous digital frames, and by other encoding schemes used to distinguish data frame packets from other data traffic carried within synchronous digital frames. Identification of frame data packets within a synchronous digital frame is disclosed, maintaining a known packet transfer rate, and with limited and known packet size expansion.

SDH payload mapper 600 communicates with a bitstream channel of rate s adaption means 601. SDH payload mapper maps bitstream channel of rate adaption means 601 into a plurality of SDH virtually concatenated virtual containers.

However, where a plurality of virtual containers of lower bit rates are used to carry a data frame of a higher bit rate, the higher rate data frame needs to be re-assembled from the plurality of lower rate virtual containers at a destination end.

Figure 7:
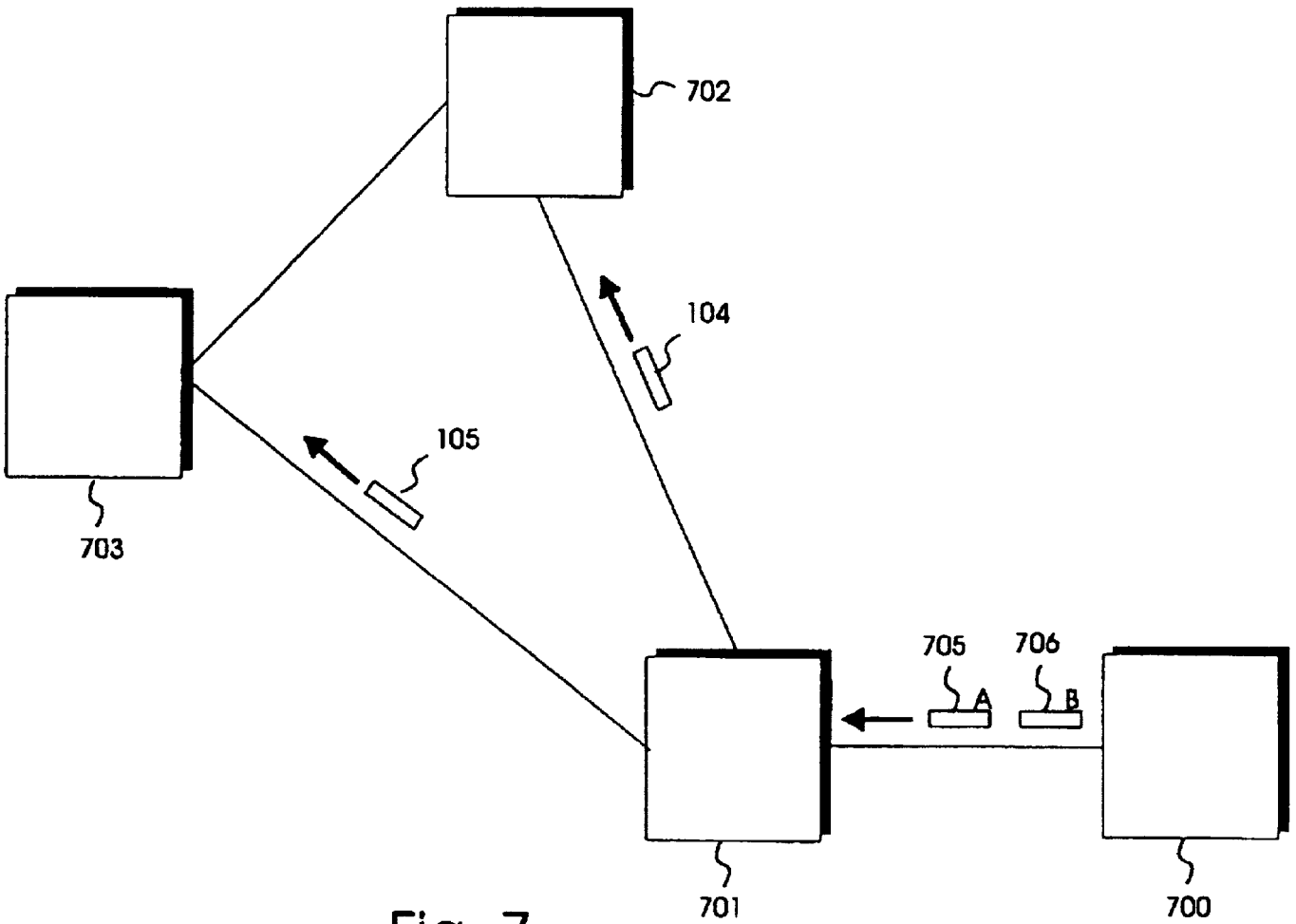
FIG. 7 illustrates schematically a differential delay problem which may occur with a plurality of virtual containers transmitted over a synchronous digital network between source and destination nodes by a plurality of different routes.

Referring to FIG. 7 herein, there is illustrated schematically a section of an SDH network comprising first to fourth nodes 700–703. Virtual containers 704, 705 sent from first node 700 and destined for third node 702 may take different paths to each other through the network, and thereby incur a different transmission delay to each other, for example first container 704 may travel direct from second node 701 to third node 702, whereas second container 705 may travel from second node 701 via fourth node 703 to third node 702, thereby incurring the additional delay of passage through fourth node 703 compared to first container 704.

This problem occurs with conventional SDH virtual containers and does not cause undue problem where the virtual containers are filled with data traffic from an appropriate telecoms tributary of an appropriate data rate, for example a 2 MBits/s tributary in the case of a VC-12.

However, where a plurality of associated virtual containers containing a single OSI layer 2 data frame are sent at substantially the same time from the first node, the plurality of virtual containers carrying collectively a higher data rate OSI layer 2 channel, the differential delay between a set of virtual containers transmitted substantially at the same time from the first node over the network becomes significant in re-assembly of the OSI layer 2 data frame. A set of virtual containers carrying a higher bit rate OSI layer 2 channel which are sent from the first node 701 simultaneously, may arrive at the destination node, third node 702 displaced in time.

Assuming that two virtual containers are used to accommodate an OSI layer 2 data rate, the two virtual containers may leave a source as two streams of virtual containers 1 and 2. At the source, the Nth frame of a virtual container in stream 1 and the Nth frame of the virtual container in stream 2 are generated simultaneously. However, at the destination, the Nth frame of one stream (1 or 2) could arrive coincident with the N±Xth frame of the other stream (where X is any arbitrary number).

Delays occur due to transmission delays along fiber links, and delays within the nodes themselves. A typical delay for a 125 μs STM-1 frame at a node is 9 bytes per STM-1 frame. This gives a lowest time delay per node of the order of 5 μs. Additionally, the delay incurred due to the transmission along optical fiber is of the order of 5 μs per kilometer. Thus, if 2 VC-4 containers are sent across a network by different routes, having a round trip geographical distance difference of 1000 kilometers, the containers could arrive at the same destination 5 milliseconds apart due just to the difference in fiber delay between the two routes. This is in addition to any delays incurred through passing through additional nodes, which can be of the order of up to 50–100 μs per node. A differential delay between source and destination over a large network of the order of 10 ms may be incurred.

The above delays do not occur for all virtual containers. For example for 2 VC-3s that run over the same physical route contained in the same VC-4, then the differential delay will be null (because the two VC-3s traverse the same route). On the other hand, where 2 VC-3s run over different routes, which could happen if a path protection switch only occurs on one VC, then the differential delay as described above may be incurred.

The problem is addressed in the best mode implementation herein by virtually concatenating a plurality of virtual containers at the send transmitter. In this specification, by virtual concatenation it is meant that the underlying network is unaware of any special relationship between the virtual containers which make up the group of associated virtual containers. No action is taken at intermediate nodes to suppress the differential delay between virtual containers, but rather that the responsibility for maintaining bit sequence integrity in the payload of a plurality of virtual containers is left with the terminating equipment.

The following example relates to the case where an OSI layer 2 data frame at a first data rate is contained within a pair of simultaneously created VC-3s, each having a second, lower, data rate, the 2 VC-3s being virtually concatenated together and transmitted on to a synchronous network simultaneously.

Figure 8:
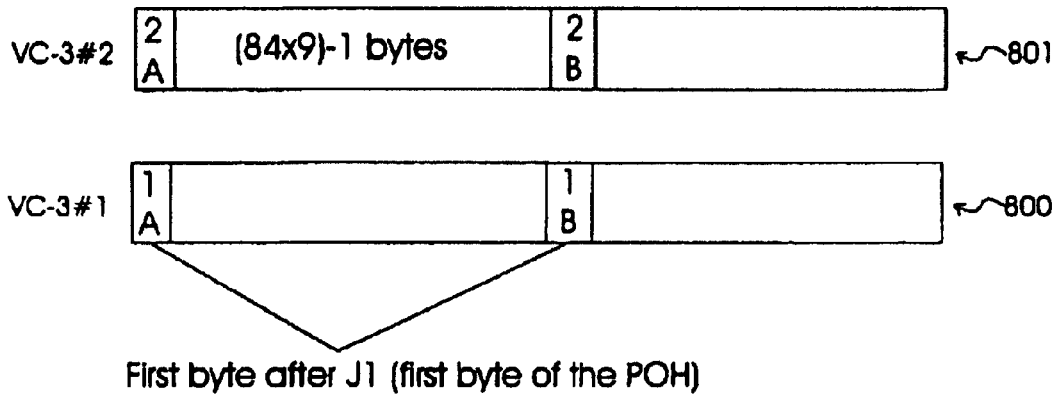
FIG. 8 illustrates schematically a plurality of virtual containers which are virtually concatenated with each other to form an effective container for an OSI layer 2 data frame payload.

Referring to FIG. 8 herein, there are illustrated first and second streams of VC-3s 800, 801 respectively which are simultaneously created at a transmit apparatus. Each VC-3 payload comprises 84×9 bytes in 125 μs, including the VC-3 path overhead bytes. The pair of VC-3 streams are created with timing to suit the local transmit equipment multi-frame synchronization, and may have a convenient pointer value. Each virtual container stream is identified by a virtual container stream number designated by a stream identification data comprising a byte in a designated position of the payload. For example, the first byte 800, 801 after the VC path overhead may be used to designate the virtual container stream number within the plurality of virtually concatenated VCs, eg stream number 1 in 800 and stream number 2 in 801. Additionally, to identify the sequence of virtual containers within a stream further sequence identification data A, B are added within the VC-3 payload. Stream number data and sequence data may or may not be located in the same byte. The sequence identification data A, B increment before resetting and then repeating as VC's are generated. The number of frames over which the sequence markers A, B must increment before resetting and repeating is determined by the maximum differential delay between VC's which may be expected. The sequence markers are incremented such that if the maximum differential delay expected is equivalent to a time taken to generate N VC-3 frames, then the incrementation markers must run over at least 2N+1 frames in a stream before repeating. The extra 1 frame over 2N frames is to allow for the payload bytes not being uniformly spread over the 125 μs frame interval.

The virtual container stream numbers data indicate to which of a plurality of associated streams of virtual containers an individual virtual container belongs, whilst the sequence marker data indicates a time at which the virtual container was generated in relation to other previously and future generated virtual containers in the same stream and in associated other streams of virtual containers.

In the best mode described herein, the stream identification data and the sequence identification data (sequence markers) are incorporated in the VC payload section, preferably immediately after the VC overhead. However, in further alternative implementations, the path trace bytes present in the VC overhead may be used to identify a stream of virtual containers to which a particular virtual container belongs. The path trace byte is used conventionally to provide a 16 byte (or 64 byte in the case of SONET) identifier data for identifying which particular circuits a virtual container belongs to, ie for example the 16 byte path trace overhead may be used for example by a network operator to check that they have correctly connected paths across a network, path trace bytes may be used to specify a source and destination location, a customer, and a bit rate of a path or connection. Provided each of a plurality of streams of virtual containers have a unique path trace byte data, then the path trace byte identification data may be used additionally as the stream identification data.

Similarly, in the further implementation the sequence identification data may also be incorporated in the path overhead of the virtual containers. Options for incorporating sequence identification data in the VC path overhead, include using part of the K3 byte in the VC path overhead for sequence identification purposes. In the prior art, the K3 byte of the VC overhead has bits 1–4 already allocated in ITU-T recommendations. However, bits 5–8 of the K3 byte are user definable and in the alternative specific implementation described herein, may be used for carrying the sequence identification data. However, use of the K3 byte would enable only short sequences of virtual containers to be implemented before repetition of the sequence cycle occurs, due to the low number of bits available. Secondly, a sequence identification data pattern may be incorporated over several virtual containers by utilizing one bit or more from the payload of each successive virtual container of a VC stream. In an extreme case, only one bit per VC overhead needs to be taken to implement the sequence pattern. A pattern of ones and zeroes collected from successive virtual containers of a steam may be decoded to give the information of where in the VC stream sequence, a particular virtual container occurs. However, this implementation requires collection of a plurality of virtual containers in order to determine the start and finish of a sequence. By using appropriate prior art sequences, it is theoretically possible to cater for theoretically infinite delays between received virtual containers from different streams. Additionally, the scheme may be vulnerable to bit errors in the sequence bits. In this alternative implementation, efficiency is improved over the first implementation, since no payload data needs to be displaced by the association data, however the hardware and software required for identifying sequences in the second implementation herein becomes more complex and a larger number of virtual containers need to be received before sequence identification can commence.

Figure 9:
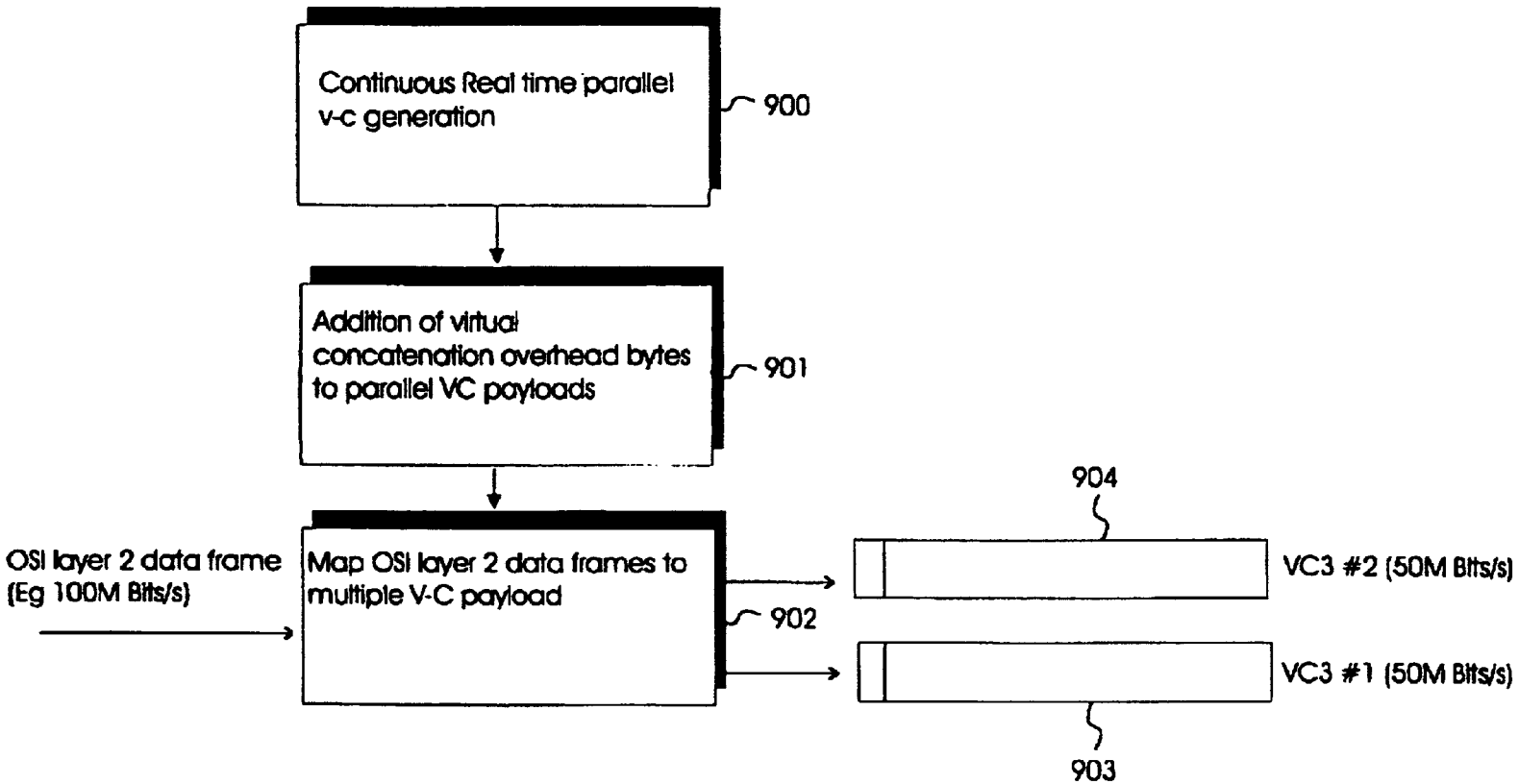
FIG. 9 illustrates schematically components of an OSI layer 2 port as illustrated in FIG. 6 herein, operating to fill a plurality of virtually concatenated virtual containers, each virtual container being of a lower bit rate, with a higher bit rate OSI layer 2 data frame.

Referring to FIG. 9 herein, there is illustrated schematically part of a transmit apparatus for constructing a plurality of virtually concatenated virtual containers, for carrying an OSI layer 2 data frame. Virtual container generator 900 continuously outputs a plurality of virtual containers in parallel. Virtual concatenator 901 adds a plurality of virtual concatenation overhead bytes containing the stream numbers and sequence markers just referred to. Mapping means 902 maps OSI layer 2 data frames to the plurality of virtual containers which are associated with each other by addition of virtual concatenation overhead bytes. In the example of FIG. 9, there is shown an input data stream of OSI layer 2 data frames at a bit rate of 100 MBits/s (eg a 100 MBits/s Ethernet data frame). The OSI layer 2 data frame is distributed amongst a plurality of VC-3s (2 in this case) 903, 904 each having a data rate of 50 MBits/s, which are launched in parallel onto a synchronous digital network.

Figure 10:
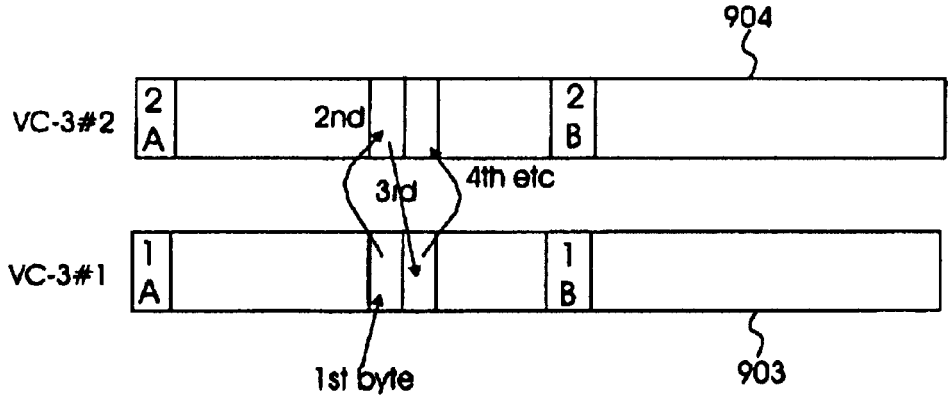
FIG. 10 illustrates schematically how an OSI layer 2 data frame of a higher bit rate is carried in a plurality of virtually concatenated virtual containers by byte interleaving the OSI layer 2 data frame between payloads of the virtual containers.

Incorporation of the OSI layer 2 data frame into the plurality of virtual containers is by byte interleaving as illustrated schematically in FIG. 10 herein. A first byte of the OSI layer 2 data frame is input into the payload of first VC-3, a second byte of the OSI layer 2 data frame is input into the payload of the second VC-3, a third byte of the data frame is input into the payload of the first VC-3, a fourth byte of the data frame payload is input into the payload of the second VC-3, and so on, so that alternate bytes of the OSI layer 2 data frame are distributed between the payloads of the first and second VC-3s respectively. Each VC-3 is generated with a bit rate of the order 50 MBits/s. By distributing the 100 MBits/s OSI layer 2 data frame between 2 VC-3s, which are associated with each other by virtue of the added virtual concatenation overhead bytes the 100 MBits/s OSI layer 2 data frame is carried directly in the payload of the VC-3s over a synchronous network. At the transmit apparatus, a plurality of virtually concatenated VC-3 payloads are effectively treated as if they were a single payload, into which an OSI layer 2 data frame is input.

Figure 11:
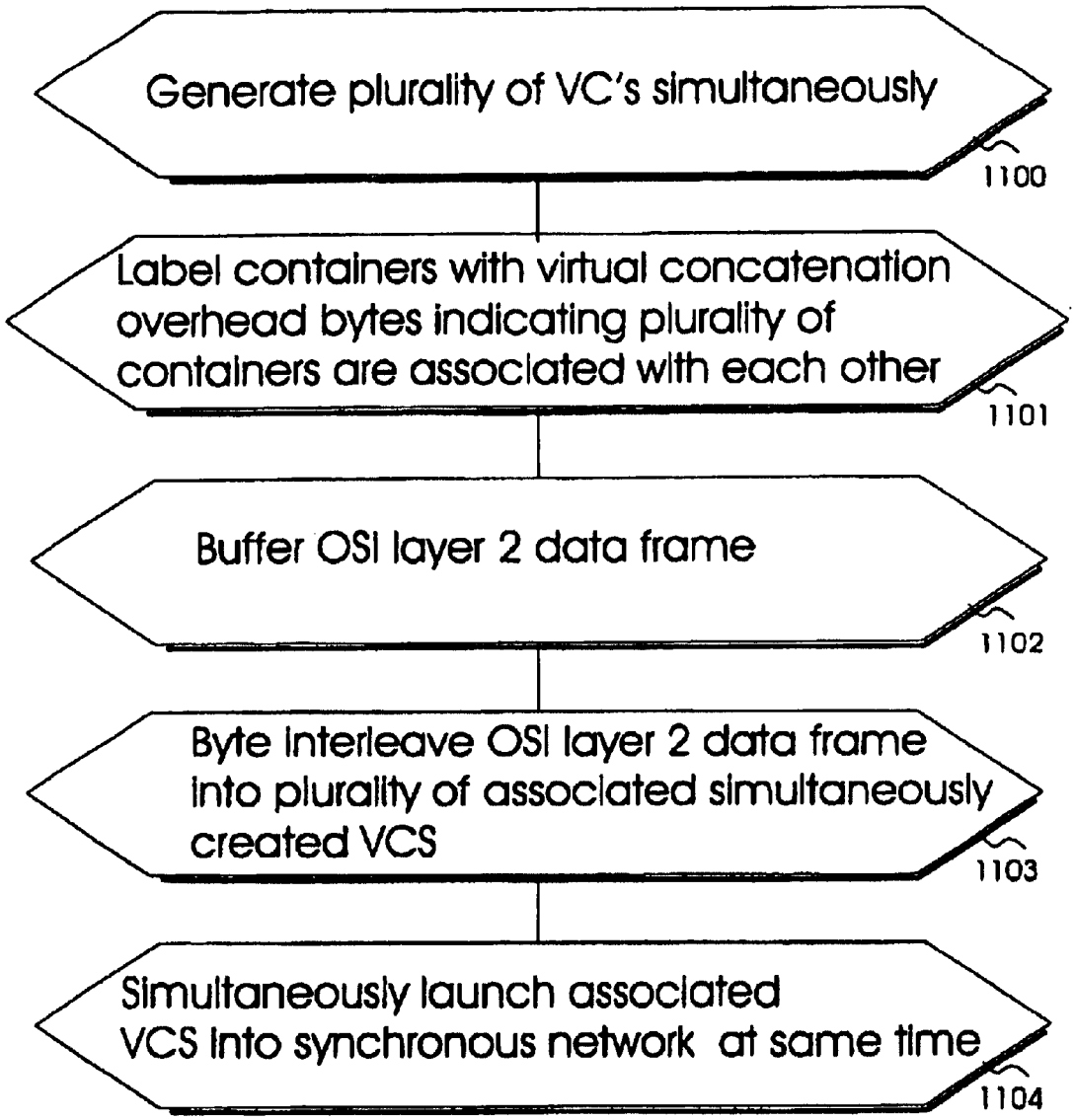
FIG. 11 illustrates schematically process steps of a transmit process carried out by the port apparatus of FIG. 6.

Referring to FIG. 11 herein, there is illustrated schematically steps in a method carried out by the transmit apparatus, which are carried out in real time and continuously as OSI layer 2 data frames are input into payloads of a plurality of virtually concatenated virtual containers. In step 1100, there are continuously generated a plurality of parallel virtual containers, which are associated together by means of virtual concatenation overhead bytes in step 1101. In step 1102, OSI layer 2 data frames are input and buffered in real time in a first in first out buffer. Bytes of data from the buffered OSI layer 2 data frame are byte interleaved into a plurality of virtual containers in parallel in step 1103. In step 1104 a plurality of virtually concatenated virtual containers are output in parallel onto a synchronous digital transmission network at the same time.

Figure 12:
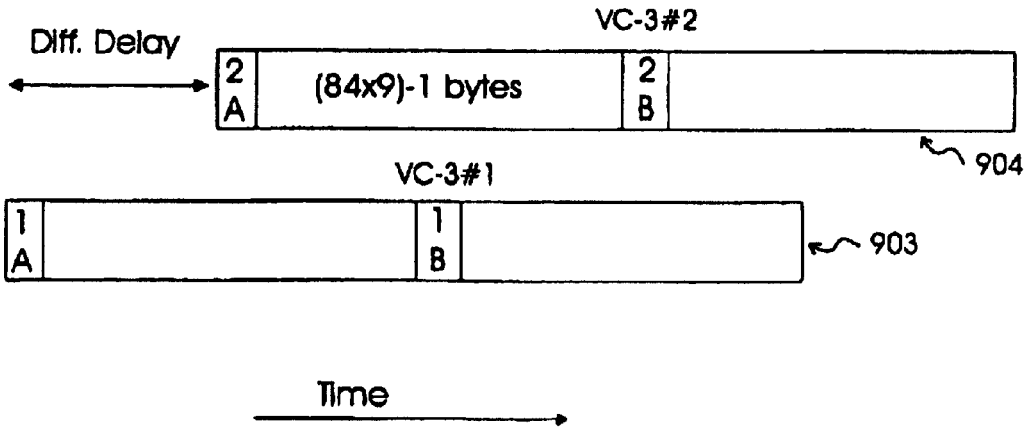
FIG. 12 illustrates schematically how a pair of virtual containers may arrive with a differential delay at a destination port apparatus, the pair of virtual containers arriving in a first order.
Figure 13:
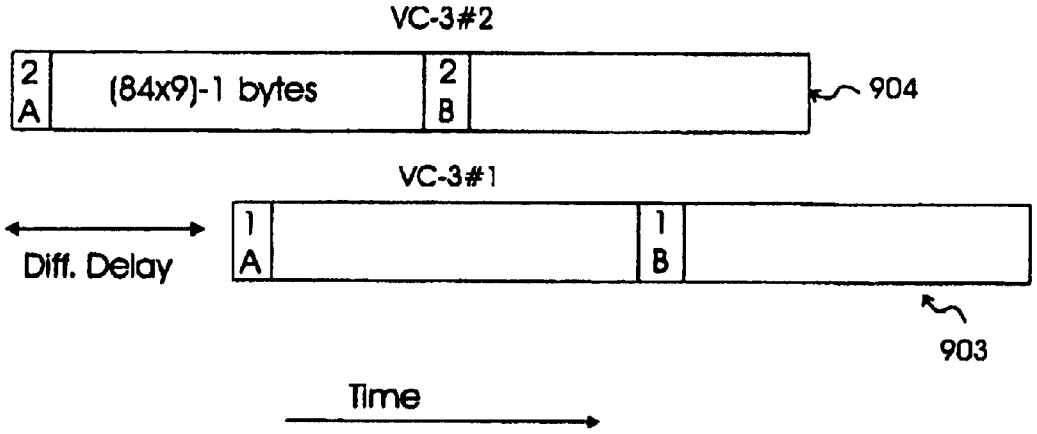
FIG. 13 illustrates schematically how a pair of virtual containers may arrive with a differential delay at a destination port apparatus, the pair of virtual containers arriving in a second order.

At a destination end, the first and second VC-3s may arrive with a differential delay, as illustrated schematically in FIG. 12 herein. First VC-3 stream 903 may arrive before second VC-3 stream 904 as illustrated schematically in FIG. 12, or alternatively first VC-3 stream 903 may arrive after second VC-3 stream 904 as illustrated schematically in FIG. 13 herein. In each of FIGS. 12 and 13, for ease of illustration, a differential delay between the arrivals of first and second VC-3s of less than one frame (125 μs) is shown. However, in general the differential delay may be anything up to 10 ms as described previously.

Referring to FIGS. 14 to 17 herein, there is illustrated schematically a receive operation at a destination device, whereby a pair of VC-3 streams which have experienced differential delays over a transmission network arrive at the device at different times. Received virtual containers are fed into a memory device as they are recovered from their STM frames. As soon as an arriving virtual container is received the virtual concatenation overhead bytes of the VC payload are read to extract the stream identification data and sequence identification data which determine the memory location to which the VC should be written. Separate areas of the memory device are set aside for reception of a plurality of virtual containers in parallel. For example, for the receipt of 2 VC-3 containers 903, 904 separate memory areas are allocated to those two virtual containers. The memory is divided into two for the two streams 1 and 2. Each half is then divided to accommodate the sequence of VC-s A to X. When the sequence repeats the memory is over written. For example in FIG. 14, first and second VC-3s 903, 904 respectively are directed to first and second memory areas 1400, 1401 respectively as soon as they are received. Since one virtual container is received before another, memory locations in area 1400, will be written to before memory locations in area 1401.

Figure 14:
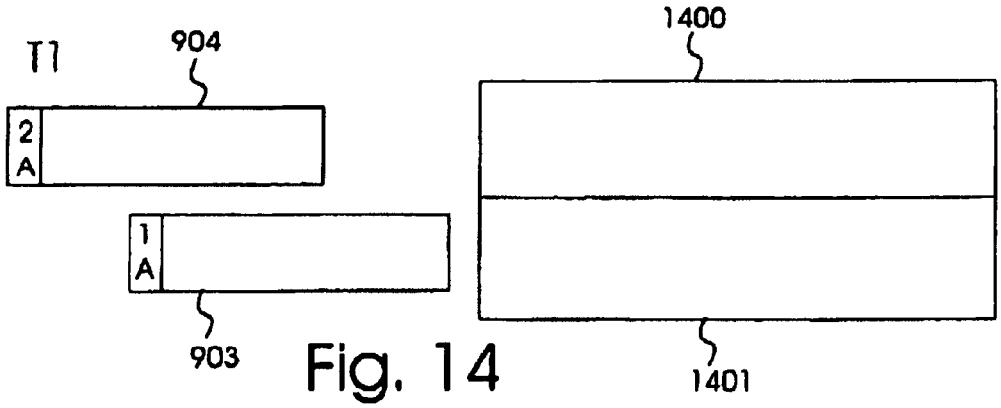
FIGS. 14 to 17 illustrate schematically how a pair of virtual containers arriving at a destination port apparatus with a differential delay are processed for recovery of an OSI layer 2 data frame from the payloads of the pair of virtual containers.
Figure 15:
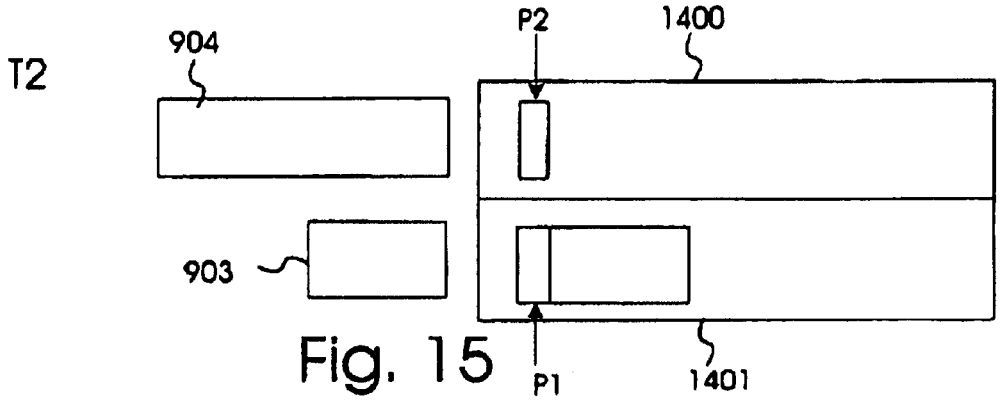
Figure 16:
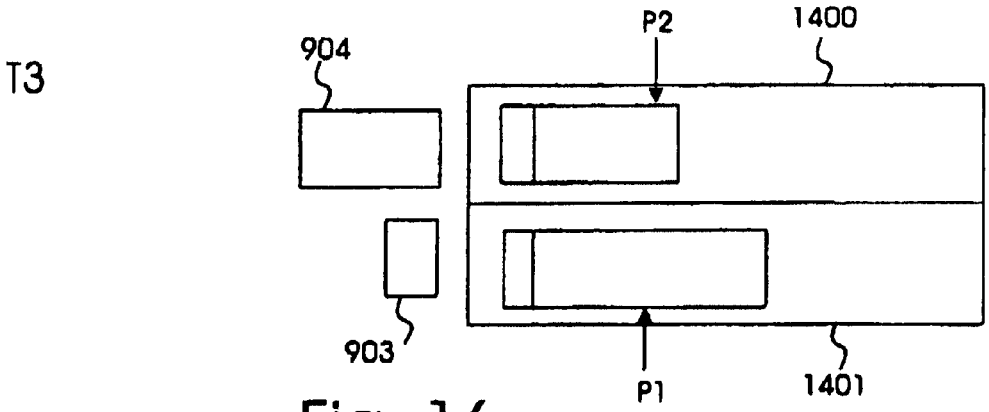
Figure 17:
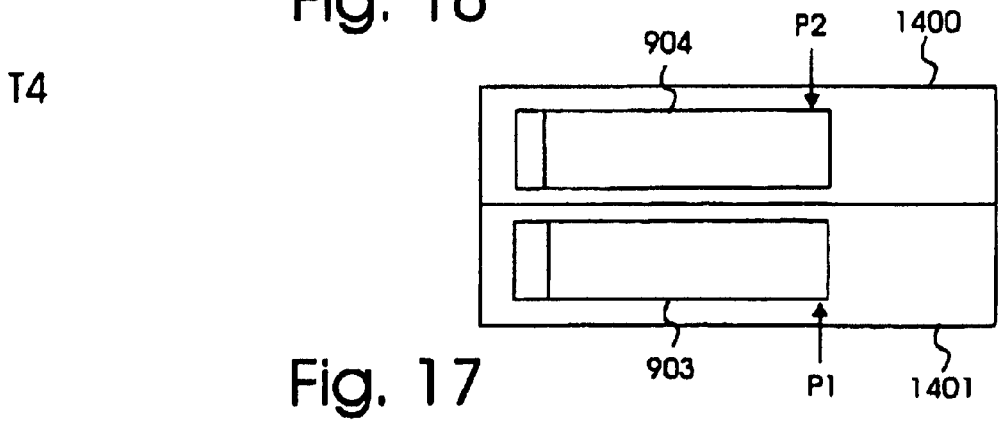

As the virtual containers arrive, their contents are stored in the appropriate memory areas in parallel in real time. For ease of illustration a case of two virtual containers which arrive within a differential delay of 125 μs is shown in FIGS. 14 to 17 herein. There is illustrated schematically at different times T1–T4 how the pair of VC-3s are loaded into the corresponding memory areas at these times. In FIG. 14, at time T1 the pair of VC-3s have not yet arrived, and therefore no bytes of these VC-3s are stored in the memory device. In FIG. 15 at time T2 the first VC has arrived at the destination, and the virtual concatenation of bytes of a first few bytes of the first VC-3 903 has been stored in first memory area 1401, beginning at P1. P2 indicates where the VC-3 of stream 2, frame A will be stored when it arrives. In FIG. 16, both first and second VC-3s are arriving at the destination end in parallel at time T2. A greater number of received payload bytes are stored in the first memory area 1401 for the first VC-3 than are stored in the second memory area 1400 for the second VC-3. The remaining portions of first VC-3 903 and second VC-3 904 have yet to arrive at the destination equipment. In FIG. 17, there is illustrated at time T4, the memory area after arrival of both the first and second VC-3s. Both VC-3s have been completely received and stored in their corresponding respective memory areas. At this time the next VC frame (B in the sequence) of stream 1 is being written in another memory location.

Figure 18:
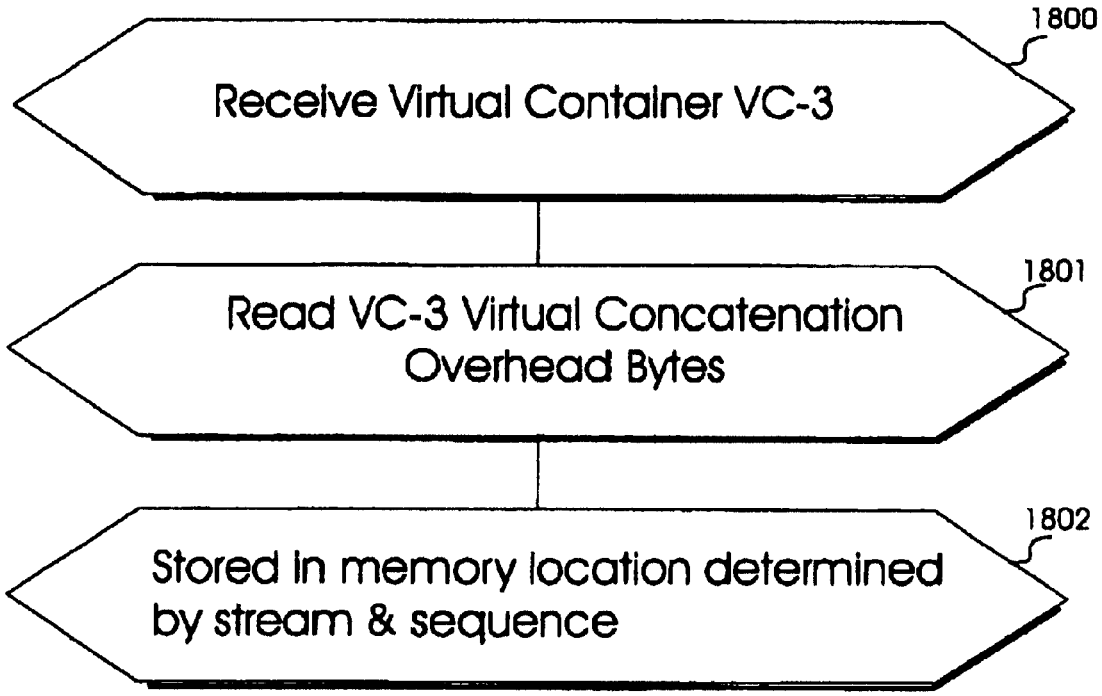
FIG. 18 illustrates schematically a process for receiving a plurality of associated virtual containers comprising a virtual concatenation of virtual containers at a destination port.

The overall parallel process for receiving VCs operated at the destination apparatus is illustrated schematically in FIG. 18 herein. In step 1800, first VC reception begins and in step 1801, the first few bytes containing the virtual concatenation overhead is read. In step 1802 there are decoded the virtual concatenation overhead data bytes of the first received virtual container which associate the VCs together. A plurality of memory locations are allocated, each corresponding to an anticipated received virtual container of the plurality of associated (virtually concatenated) virtual containers. In step 1804, the arriving virtual containers are directed to their corresponding respective reserved memory areas, according to stream and sequence number read from the virtual concatenation overhead.

Referring again to FIGS. 14 to 17 herein, there is now described a method of reconstituting an OSI layer 2 data frame from the plurality of received virtually concatenated virtual containers.

Referring again to FIGS. 14 to 17 herein there is illustrated how an OSI layer 2 data frame payload of first and second virtually concatenated VCs is reassembled upon receipt of the pair of VCs at a destination apparatus having a port as described in FIG. 6 herein. On receipt of first incoming VC 903, a plurality of memory areas are reserved for the association of VCs forming the virtual concatenation of VCs. Once bytes from both the first and second VCs with the same sequence number are received, re-assembly of the OSI layer 2 data frame may commence. A first pointer P1 is set to a memory location of first memory area 1400 containing a first byte of the first VC with the sequence number to be processed, and similarly, a second pointer P2 is set to a second memory location of second memory area 1401 corresponding to a first received byte of the second VC with the same sequence number as illustrated schematically in FIG. 15 herein.

As the first and second memory areas fill up with received bytes of the respective first and second VCs, alternate bytes from the first and second VCs are read by moving the read pointer along the memory locations in parallel and reading alternate byte interleaved data comprising the OSI layer 2 data frame from the payloads of the first and second VCs. The earliest time at which reading can commence limited by the latest time at which the latter arriving of the first and second VCs with the same sequence marker begins to be stored in the memory.

Figure 19:
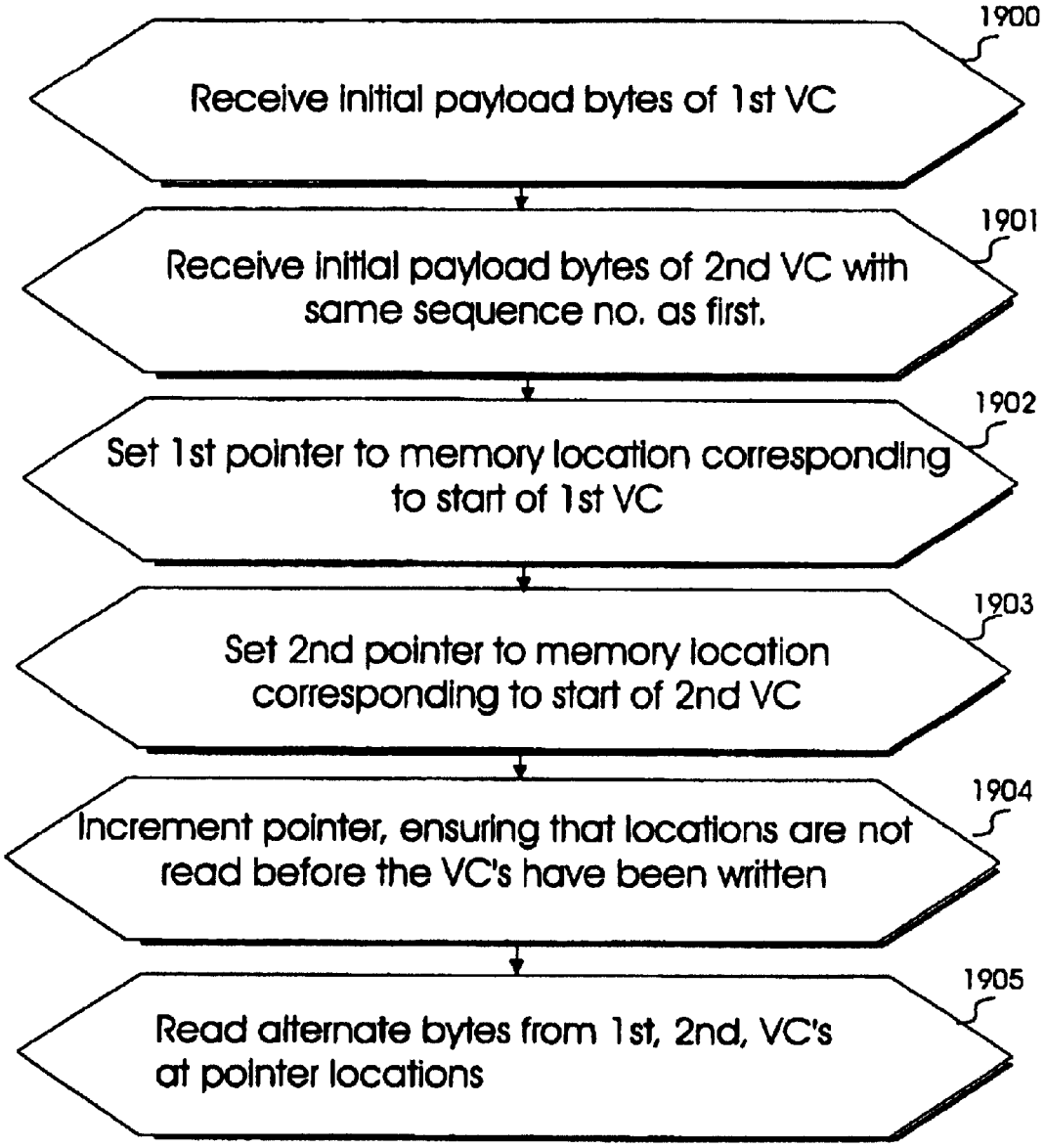
FIG. 19 illustrates schematically a process for extraction and re-assembly of an OSI layer 2 data frame from the payloads of a plurality of received associated virtual containers comprising a virtual concatenation of virtual containers.

Referring to FIG. 19 herein, there are illustrated schematically process steps for re-assembly of an OSI layer 2 data frame from a plurality of VC payloads received at a destination receiving apparatus. In step 1900, the initial payload bytes of a first virtual container are received and in step 1901 a first pointer is set to a memory location corresponding to the initial bytes of the first VC payload. In step 1902, initial payload bytes of a second VC are received and stored in a second memory location. In step 1903, a second pointer is set to a memory location corresponding to the start of the second virtual container with the same sequence marker as the first. The first and second pointers are moved in parallel with each other in steps along successive memory locations containing successive payload bytes of the first and second VC payloads in step 1904, allowing reading of alternate bytes from the first, second, first, second, first, second pointers and so on, in step 1705. The OSI layer 2 data frame is assembled in real time as the virtual containers arrive from the interleaved bytes read from the memory locations of the first and second pointers P1, P2 in step 1906.

In a best mode implementation for performing the read operation, each memory area allocated to a virtual container stream is preferably large enough to contain enough bytes corresponding to twice the maximum anticipated differential delay between arrival of two virtual containers. Although this implementation is inefficient of memory usage, in that only enough memory to accommodate the different delay is required in theory, operation is simplified.

Figure 20:
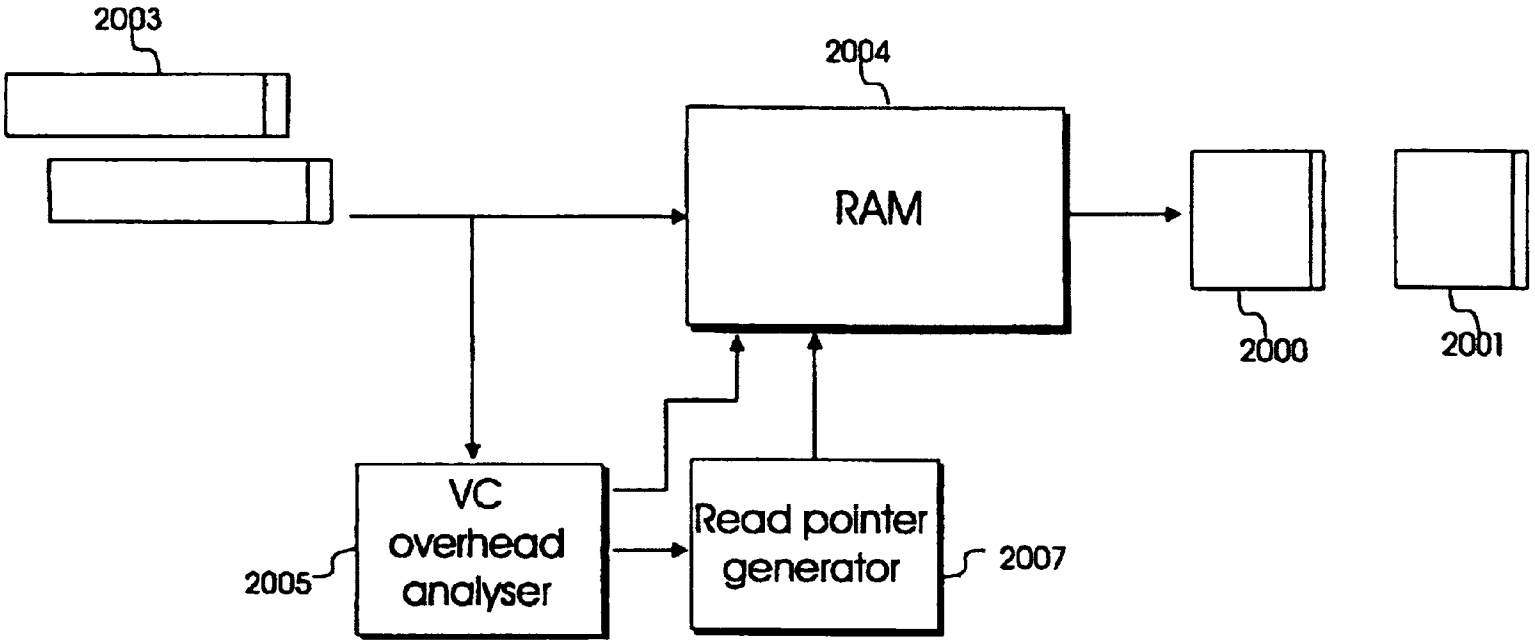
FIG. 20 illustrates schematically components of an OSI layer 2 port for receiving virtual containers and recovering OSI layer 2 data frames from a plurality of virtually concatenated virtual containers.

Referring to FIG. 20 herein, there is illustrated schematically components of an OSI layer 2 port for recovering a stream of OSI layer 2 data frames 2000, 2001 from a plurality of streams of incoming virtual containers 2003. The components comprise a random access memory 2004 divisible into a plurality of memory areas, each containing a payload of an incoming virtual container; a data processor means configured for operating as a virtual container virtual concatenation overhead byte analyser 2005 for reading virtual concatenation overhead bytes of the plurality of virtual containers and determining from those bytes the memory locations in which the payload data is stored, and a read point generator 2007, receiving inputs from the virtual concatenation overhead byte analyser operating to generate read pointers for the appropriate memory location to be read. The read pointer generator 2007 generates a plurality of read pointers which each address a specific identified memory location within each memory area, the memory locations to which the read pointers are set being selected such that reading those pointed to memory locations in sequence recovers the OSI layer 2 data frame sequentially. A plurality of memory areas have their individual memory locations read contiguously so as to recover the OSI layer 2 data frames from the plurality of virtual containers which may be received at the OSI layer 2 port non-contiguously, having a differential delay there between.

What is claimed is:

[1. A method of transporting data preparing data for transmission over a synchronous digital network, said method comprising the steps of:

generating in parallel a plurality of synchronous virtual containers, each to be transmitted over said synchronous digital network at a lower bit rate than a bit rate of said data to be transmitted, each said virtual container having a payload section and a path overhead section;

associating said plurality of virtual containers with each other by means of inputting assigning association data describing said association into said path overheads of said plurality of virtual containers; and inputting said transported data to be transmitted into said payloads of said plurality of virtual containers; and outputting said plurality of associated virtual containers onto a synchronous digital network.]

[2. The method as claimed in claim 1, wherein said plurality of associated virtual containers are transmitted over output onto said synchronous digital network substantially in parallel.]

[3. The method as claimed in claim 1, wherein said step of inputting said transported data to be transmitted into said payloads of said plurality of virtual containers comprises byte interleaving bytes of a frame of said transported data to be transmitted between said plurality of payloads.]

[4. The method as claimed in claim 1, wherein said plurality of virtual containers are generated as a plurality of streams of virtual containers and said step of associating said plurality of virtual containers with each other comprises associating a plurality of said plurality of streams of virtual containers with each other.]

[5. The method as claimed in claim 1, wherein said plurality of virtual containers are generated as a plurality of streams of virtual containers, and said step of associating said plurality of virtual containers together by means of assigning inputting association data comprises adding inputting stream identification data to each said virtual container, said steam identification data identifying which of said plurality of streams said virtual container belongs to.]

[6. The method as claimed in claim 1, wherein said plurality of virtual containers are generated as a plurality of streams of virtual containers and said step of associating said plurality of virtual containers together by means of assigning inputting association data comprises including inputting sequence identification data to individual ones of each said plurality of virtual containers, said sequence identification data designating a sequence in which said individual virtual containers are generated with respect to each other.]

[7. The method as claimed in claim 6, wherein said plurality of virtual containers are generated as a plurality of streams of virtual containers and said step of associating said plurality of virtual containers together by means of assigning association data comprises assigning to individual ones of said plurality of virtual containers a sequence identification data comprising comprises a cyclically repeating code data.]

[8. The method as claimed in claim 7, wherein said plurality of virtual containers are generated as a plurality of streams of virtual containers and said step of associating said plurality of virtual containers together by means of assigning association data comprises assigning to individual ones of said plurality of virtual containers a cyclically repeating code sequence having has a repetition period of at least 2 N+1, where N is the repetition number of sequentially received virtual container payloads in a single stream number of frames generated in a period of time equivalent to a maximum differential delay expected between virtual containers.]

[9. The method as claimed in claim 6, wherein a said plurality of virtual containers are generated as a plurality of streams of virtual containers and said step of associating said plurality of virtual containers together by means of assigning association data bytes comprises including a sequence identification data in individual ones of said plurality of virtual containers, said sequence identification data designating a sequence in which said individual virtual container is generated within a said stream of virtual containers, said sequence identification data being carried within a K3 byte of an overhead section of said virtual container is input into a K3 byte of each said virtual container.]

[10. The method as claimed in claim 6, wherein said step of receiving a plurality of virtual containers comprises receiving a plurality of separate streams of associated virtual containers, and said step of identifying an association data from said plurality of virtual containers comprises reading a plurality of sequence identification data is read designating where, in a stream of said virtual containers, a said virtual container belongs, said sequence data being read from a K3 byte of each of said plurality of virtual containers.]

[11. The method as claimed in claim 1, wherein the said plurality of virtual containers are generated as a plurality of virtual container streams and said step of associating said plurality of virtual containers together by means of assigning association data comprises utilizing a path trace byte in a virtual container overhead as a stream identifier data for identifying a virtual container as belonging to a particular said virtual container stream. The method as claimed in claim 6, wherein said stream identification data is output into a path trace byte of each said virtual container.]

[12. The method as claimed in claim 1, wherein said plurality of virtual containers are generated as a plurality of streams of virtual containers and said step of associating said plurality of virtual containers together by means of assigning association data comprises assigning to individual ones of said plurality of virtual containers a sequence identification data comprising a code data extending over a plurality of said virtual containers of a said stream, for identifying a position of each said virtual container within said virtual container stream.]

[13. A method as claimed in claim 1, wherein each association of virtual containers is identified by a path trace byte in the overhead of each of said association virtual containers.]

[14. The method as claimed in claim 1, wherein data indicating the time which each virtual container was generated relative to other associated virtual containers is provided by a sequence marker for each virtual container, and wherein the maximum differential delay expected between virtual containers at a destination in said synchronous digital network determines the number of frames over which a sequence marker must increment before it is repeated, the sequence marker being incremented every 2N+1 frames wherein N is the number of frames generated in time equivalent to the maximum differential delay.]

[15. Apparatus for incorporating data input at a first data rate into a plurality of streams of synchronous digital hierarchy virtual containers each output at a second data rate, said apparatus comprising:

means for continuously generating a plurality of virtual containers in parallel;

means for generating data describing an association of said plurality of virtual containers, and for assigning said association data to said plurality of associated virtual containers; and means for inserting said first data rate data into said plurality of payloads of said plurality of virtual containers. Apparatus for preparing data for transmission over a synchronous digital network, said apparatus comprising:

a virtual container generator arranged to generate in parallel a plurality of synchronous virtual containers, each to be transmitted over said synchronous digital network at a lower bit rate than a bit rate of said data to be transmitted, each said virtual container having a payload section and a path overhead section;

a virtual container associator arranged to associate said plurality of virtual containers with each other by means of inputting association data into said path overheads of said plurality of virtual containers; and a data inputter arranged to input said data to be transmitted into said payloads of said plurality of virtual containers.]

[16. A method of recovering data from a plurality of synchronous virtual containers received over a synchronous digital network, said method comprising the steps of:

receiving said plurality of virtual containers each said virtual container having a payload section and a path overhead section;

reading identifying associating data from said path overheads of said plurality of virtual containers, said association data indicating an association between individual ones of said plurality of virtual containers;

reading data bytes from each said payloads of said plurality of associated virtual containers; and re-assembling said data from said plurality of read payload data bytes in response to said indicated association.]

[17. The method as claimed in claim 16, wherein said process step of reading said data bytes from said payloads comprises reading a plurality data bytes of said payloads in a byte interleaved manner.]

[18. The method as claimed in claim 16, wherein said step of identifying an association data from each of said plurality of virtual containers comprises reading a plurality of stream identification data from said plurality of virtual containers, said stream identification data designating which of a plurality of streams of virtual containers said associated virtual containers belong to.]

[19. The method as claimed in claim 18, wherein said step of receiving a plurality of said virtual containers comprises receiving a plurality of separate streams of associated virtual containers, and said step of identifying an association data from said plurality of virtual containers comprises inspecting wherein said stream identification data is read from a path trace byte of each of a plurality of said plurality of virtual containers, and distinguishing from which of a set of said streams of virtual containers said individual virtual containers belong, from said read path trace data bytes.]

[20. The method as claimed in claim 16, wherein said step of identifying an association data between said plurality of virtual containers comprises reading a plurality of association data comprises sequence identification data designating where in a sequence of virtual containers each an individual virtual container belongs.]

[21. The method as claimed in claim 16, wherein said step of receiving a plurality of said plurality of virtual containers comprises receiving a plurality of separate streams of associated virtual containers simultaneously.]

[22. The method as claimed in claim 16, wherein said step of reading data bytes from each payload of said plurality of associated virtual containers comprises reading said data bytes substantially in parallel from a plurality of virtual containers of a same sequence identification from a plurality of associated virtual container streams.]

[23. A method of recovering data frames carried in payloads of a plurality of associated synchronous digital hierarchy virtual containers of a synchronous digital network, said method comprising the steps of:

for each said virtual container:

reading data association data from a path overhead of said virtual container, said association data indicating an association between said virtual container and other ones of said plurality of virtual containers allocating a memory storage area for storing a payload of said virtual container;

inputting said virtual container payload into said memory area; and reading said data from said memory area in parallel with data read from other said memory areas corresponding to payloads of other said virtual containers ones of said plurality of virtual containers, thereby to recover said data frames.]

[24. The method as claimed in claim 23, wherein a said data frame is distributed between said plurality of virtual containers and said step of, for each said virtual container, reading data from said memory area in parallel with data of other virtual containers comprises:

for each said memory area, setting a read pointer to a memory location of said memory area;

wherein said plurality of read pointers are set to said memory locations such that successive bytes of said data frame are read from said plurality of memory locations in sequence.]

[25. The method as claimed in claim 23, further comprising the step of assembling said data frame from said parallel read data.]

[26. The method as claimed in claim 23, wherein said data frames comprises an OSI layer 2 data frames.]

[27. A method of recording a data block carried in payloads of a plurality of streams of payloads of a plurality of associated synchronous digital hierarchy virtual containers of a synchronous digital network, said method comprising steps of:

receiving a plurality of streams of said plurality of associated virtual containers;

reading association data from path overheads of virtual containers of each of said plurality of streams, said association data indicating an association between said plurality of virtual containers;

for each said received virtual container stream allocating a corresponding respective memory area for storage of data payloads of virtual containers of each said stream;

storing said plurality of virtual container payloads in said corresponding allocated respective memory areas in dependence on said association; and reading individual bytes of said plurality of stored virtual container data payloads in sequence to reconstruct recover said data block.]

[28. The method as claimed in claim 27, wherein said step of reading individual bytes of said plurality of payloads comprises;

for each said memory area, setting a read pointer to a memory location corresponding to a next data byte of said data block to be read, contained within that data payload; and reading said data byte once a preceding data byte of said data block has been read from a memory location of another said memory area.]

[29. The method as claimed in claim 27, wherein said step of reading individual bytes of said plurality of payloads comprises reading bytes from each of a plurality of said memory areas in which said virtual container payloads are stored.]

[30. Apparatus for recovering data from a plurality of synchronous digital hierarchy virtual containers of a synchronous digital network containing said data, said means apparatus comprising:

a random access memory configured into a plurality of individual memory areas allocated for storage of payloads of said plurality of virtual containers;

a data processor means operating to identify an read association data from path overheads of each of said virtual containers, said association data indicating an association of between said plurality of virtual containers; and a data processor arranged to generate means for generating a plurality of read pointers for each said plurality of individual memory areas, said read pointers enabling data to be read from a operating to successively read a plurality of memory locations of said memory areas, thereby to recover said for recovering said data from said plurality of virtual containers, said read pointers being generated in dependence on said association data.]

[31. A method of transporting data over a synchronous digital network, said method comprising the steps of:

generating in parallel a plurality of synchronous virtual containers, each at a lower bit rate than a bit rate of said data, each said virtual container having a payload section;

associating said plurality of virtual containers with each other by means of assigning association data describing said association into said plurality of virtual containers;

indicating for each virtual container the time at which each virtual container was generated relative to other associated virtual containers;

inputting said transported data into said payloads of said plurality of virtual containers; and outputting said plurality of associated virtual containers onto a synchronous digital network, wherein data indicating the time at which each virtual container was generated relative to other associated virtual containers is incorporated over several virtual containers by utilizing one or more bits from each successive virtual container of an association of virtual containers.]

[32. A method as claimed in claim 31, wherein indicating a time at which each virtual container was generated relative to other associated virtual containers is incorporated over several virtual containers by utilizing one or more bits from the payload of each successive virtual container of an association of virtual containers.]

[33. A method as claimed in claim 31, wherein data indicating the time at which each virtual container was generated relative to other associated virtual containers is incorporated over several virtual containers by utilizing one or more bits from the overhead each successive virtual container of an association of virtual containers.]

*34. A method of preparing data for transmission over a synchronous digital network, said method comprising the steps of:*

*generating in parallel a plurality of virtual containers, each to be transmitted over said synchronous digital network at a lower bit rate than a bit rate of said data to be transmitted, each said virtual container having a payload section and a path overhead section;*

*associating said plurality of virtual containers with each other by means of inputting association data into said path overheads of said plurality of virtual containers; and*

*inputting said data to be transmitted into said payloads of said plurality of virtual containers,*

*wherein said plurality of virtual containers are generated as a plurality of streams of virtual containers and said step of associating said plurality of virtual containers together by means of inputting association data comprises inputting sequence identification data to each said plurality of virtual containers, said sequence identification data designating a sequence in which said individual virtual containers are, generated with respect to each other,*

*and wherein said sequence identification data is input into a K3 byte of each said virtual container.*

*35. The method as claimed in claim 34, wherein said plurality of associated virtual containers are transmitted over said synchronous digital network substantially in parallel.*

*36. The method as claimed in claim 34, wherein said step of inputting said data to be transmitted into said payloads of said plurality of virtual containers comprises byte interleaving bytes of a frame of said data to be transmitted between said payloads.*

*37. The method as claimed in claim 34, wherein said plurality of virtual containers are generated as a plurality of streams of virtual containers and said step of associating said plurality of virtual containers with each other comprises associating said plurality of streams of virtual containers with each other.*

*38. The method as claimed in claim 34, wherein said plurality of virtual containers are generated as a plurality of streams of virtual containers, and said step of associating said plurality of virtual containers together by means of inputting association data comprises inputting stream identification data to each said virtual container, said steam identification data identifying which of said plurality of streams said virtual container belongs to.*

*39. The method as claimed in claim 38, wherein said stream identification data is input into a path trace byte of each said virtual container.*

*40. A method as claimed in claim 34, wherein each association of virtual containers is identified by a path trace byte in the overhead of each of said associated virtual containers.*

*41. A method of preparing data for transmission over a synchronous digital network, said method comprising the steps of:*

*generating in parallel a plurality of virtual containers, each to be transmitted over said synchronous digital network at a lower bit rate than a bit rate of said data to be transmitted, each said virtual container having a payload section and a path overhead section;*

*associating said plurality of virtual containers with each other by means of inputting association data into said path overheads of said plurality of virtual containers; and*

*inputting said data to be transmitted into said payloads of said plurality of virtual containers,*

*wherein said plurality of virtual containers are generated as a plurality of streams of virtual containers and said step of associating said plurality of virtual containers together by means of inputting association data comprises inputting sequence identification data to each said plurality of virtual containers, said sequence identification data designating a sequence in which said individual virtual containers are generated with respect to each other,*

*wherein said sequence identification data comprises a cyclically repeating code, and wherein said cyclically repeating code sequence has a repetition period of at least 2 N+1, where N is the number of frames generated in a period of time equivalent to a maximum differential delay expected between virtual containers.*

*42. A method of preparing data for transmission over a synchronous digital network, said method comprising the steps of:*

*generating in parallel a plurality of virtual containers, each to be transmitted over said synchronous digital network at a lower bit rate than a bit rate of said data to be transmitted, each said virtual container having a payload section and a path overhead section;*

*associating said plurality of virtual containers with each other by means of inputting association data into said path overheads of said plurality of virtual containers; and*

*inputting said data to be transmitted into said payloads of said plurality of virtual containers, wherein data indicating the time at which each virtual container was generated relative to other associated virtual containers is provided by a sequence marker for each virtual container, and wherein the maximum differential delay expected between virtual containers at a destination in said synchronous digital network determines the number of frames over which a sequence marker must increment before it is repeated, the sequence marker being incremented every 2N+1 frames wherein N is the number of frames generated in a time equivalent to the maximum differential delay.*

*43. Apparatus for preparing data for transmission over a synchronous digital network, said apparatus comprising:*

*a virtual container generator arranged to generate in parallel a plurality of virtual containers, each to be transmitted over said synchronous digital network at a lower bit rate than a bit rate of said data to be transmitted, each said virtual container having a payload section and a path overhead section;*

*a virtual container associator arranged to associate said plurality of virtual containers with each other by means of inputting association data into said path overheads of said plurality of virtual containers; and*

*a data inputter arranged to input said data to be transmitted into said payloads of said plurality of virtual containers,*

*wherein said data inputter is arranged to byte interleave bytes of a frame of said data to be transmitted between said payloads.*

*44. Apparatus for preparing data for transmission over a synchronous digital network, said apparatus comprising:*

*a virtual container generator arranged to generate in parallel a plurality of virtual containers, each to be transmitted over said synchronous digital network at a lower bit rate than a bit rate of said data to be transmitted, each said virtual container having a payload section and a path overhead section;*

*a virtual container associator arranged to associate said plurality of virtual containers with each other by means of inputting association data into said path overheads of said plurality of virtual containers; and*

*a data inputter arranged to input said data to be transmitted into said payloads of said plurality of virtual containers, wherein said virtual container generator is arranged to generate said plurality of virtual containers as a plurality of streams of virtual containers, and said virtual container associator is arranged to associate said plurality of virtual containers with each other by associating said plurality of streams of virtual containers with each other.*

*45. Apparatus for preparing data for transmission over a synchronous digital network, said apparatus comprising:*

*a virtual container generator arranged to generate in parallel a plurality of virtual containers, each to be transmitted over said synchronous digital network at a lower bit rate than a bit rate of said data to be transmitted, each said virtual container having a payload section and a path overhead section;*

*a virtual container associator arranged to associate said plurality of virtual containers with each other by means of inputting association data into said path overheads of said plurality of virtual containers; and*

*a data inputter arranged to input said data to be transmitted into said payloads of said plurality of virtual containers, wherein said virtual container generator is arranged to generate said plurality of virtual containers as a plurality of streams of virtual containers, and virtual container associator is arranged to associate said plurality of virtual containers with each other by inputting stream identification data into each said virtual container, said steam identification data identifying which of said plurality of streams said virtual container belongs to.*

*46. Apparatus for preparing data for transmission over a synchronous digital network, said apparatus comprising:*

*a virtual container generator arranged to generate in parallel a plurality of virtual containers, each to be transmitted over said synchronous digital network at a lower bit rate than a bit rate of said data to be transmitted, each said virtual container having a payload section and a path overhead section;*

*a virtual container associator arranged to associate said plurality of virtual containers with each other by means of inputting association data into said path overheads of said plurality of virtual containers; and*

*a data inputter arranged to input said data to be transmitted into said payloads of said plurality of virtual containers, wherein said virtual container generator is arranged to generate said plurality of virtual containers as a plurality of streams of virtual containers, and virtual container associator is arranged to associate said plurality of virtual containers with each other by inputting sequence identification data into each said plurality of virtual containers, said sequence identification data designating a sequence in which said individual virtual containers are generated with respect to each other.*

*47. The apparatus as claimed in claim 46, wherein said sequence identification data comprises it cyclically repeating code.*

*48. A method of recovering data from a plurality of virtual containers received over a synchronous digital network, said method comprising the steps of:*

*receiving said plurality of virtual containers each said virtual container having a payload section and a path overhead section;*

*reading association data from said path overheads of said plurality of virtual containers, said association data indicating an association between said plurality of virtual containers;*

*reading data bytes from said payloads of said plurality of associated virtual containers; and*

*re-assembling said data from said plurality of read payload data bytes in response to said indicated association.*

*49. The method as claimed in claim 48, wherein said step of reading data bytes from said payloads comprises reading data bytes of said payloads in a byte interleaved manner.*

*50. The method as claimed in claim 48, wherein said association data comprises stream identification data designating which of a plurality of streams of virtual containers said associated virtual containers belong to.*

*51. The method as claimed in claim 50, wherein said stream identification data is read from a path trace byte of each of said plurality of virtual containers.*

*52. The method as claimed in claim 48, wherein said association data comprises sequence identification data designating where in a sequence of virtual containers an individual virtual container belongs.*

*53. The method as claimed in claim 48, wherein said step of receiving said plurality of virtual containers comprises*

*receiving a plurality of separate streams of associated virtual containers simultaneously.*

*54. The method as claimed in claim 48, wherein said step of reading data bytes from said payloads of said plurality of associated virtual containers comprises reading said data bytes substantially in parallel from a plurality of virtual containers of a same sequence identification from a plurality of associated virtual container streams.*

*55. A method of recovering data from a plurality of virtual containers received over a synchronous digital network, said method comprising the steps of:*

*receiving said plurality of virtual containers each said virtual container having a payload section and a path overhead section;*

*reading association data from said path overheads of said plurality of virtual containers, said association data indicating an association between said plurality of virtual containers;*

*reading data bytes from said payloads of said plurality of associated virtual containers; and*

*re-assembling said data from said plurality of read payload data bytes in response to said indicated association, wherein said association data comprises sequence identification data designating where in a sequence of virtual containers an individual virtual container belongs, and wherein said sequence identification data is read from a K3 byte of each of said plurality of virtual containers.*

*56. A method of recovering data frames carried in payloads of a plurality of virtual containers of a synchronous digital network, said method comprising the steps of:*

*for each said virtual container: reading association data from a path overhead of said virtual container, said association data indicating an association between said virtual container and other ones of said plurality of virtual containers;*

*allocating a memory storage area for storing a payload of said virtual container; inputting said virtual container payload into said memory area; and reading data from said memory area in parallel with data read from other memory areas corresponding to payloads of other ones of said plurality of virtual containers, thereby to recover said data frames.*

*57. The method as claimed in claim 56, wherein a said data frame is distributed between said plurality of virtual containers and said step of, for each said virtual container, reading data from said memory area in parallel with data comprises:*

*for each said memory area, setting a read pointer to a memory location of said memory area;*

*wherein said read pointers are set to said memory locations such that successive bytes of said data frame are read from said memory locations in sequence.*

*58. The method as claimed in claim 56, further comprising the step of assembling said data frames from said parallel read data.*

*59. The method as claimed in claim 56, wherein said data frames comprise OSI layer 2 data frames.*

*60. A method of recovering a data block carried in payloads of a plurality of streams of virtual containers of a synchronous digital network, said method comprising steps of:*

*reading association data from path overheads of virtual containers of each of said plurality of streams, said association data indicating an association between said plurality of virtual containers;*

*allocating a respective memory area for storage of payloads of virtual containers of each said stream;*

*storing virtual container payloads in said respective memory areas in dependence on said association; and*

*reading individual bytes of said plurality of stored virtual container payloads in sequence to recover said data block.*

*61. The method as claimed in claim 60, wherein said step of reading individual bytes of said plurality of payloads comprises:*

*for each said memory area, setting a read pointer to a memory location corresponding to a next data byte of said data block to be read, contained within that data payload; and*

*reading said data byte once a preceding data byte of said data block has been read from a memory location of another said memory area.*

*62. The method as claimed in claim 60, wherein said step of reading individual bytes of said plurality of payloads comprises reading bytes from each of a plurality of said memory areas in which said virtual container payloads are stored.*

*63. Apparatus for recovering data from a plurality of virtual containers of a synchronous digital network, said apparatus comprising:*

*a random access memory configured into a plurality of individual memory areas allocated for storage of payloads of said plurality of virtual containers;*

*a data processor operating to read association data from path overheads of each of said virtual containers, said association data indicating an association between said plurality of virtual containers; and*

*a data processor arranged to generate read pointers for each said plurality of individual memory areas, said read pointers enabling data to be read from a plurality of memory locations of said memory areas, thereby to recover said data from said plurality of virtual containers, said read pointers being generated in dependence on said association data.*

*64. The apparatus as claimed in claim 63 arranged to enable data bytes of said payloads, corresponding to data to be read from said plurality of memory locations, to be read in a byte interleaved manner.*

*65. The apparatus as claimed in claim 63, wherein said association data comprises stream identification data designating which of a plurality of streams of virtual containers said associated virtual containers belong to.*

*66. The apparatus as claimed in claim 63, wherein said association data comprises sequence identification data designating where in a sequence of virtual containers an individual virtual container belongs.*

*67. A method of transporting data over a synchronous digital network, said method comprising the steps of:*

*generating in parallel a plurality of virtual containers, each at a lower bit rate than bit rate of said data, each said virtual container having a payload section;*

*associating said plurality of virtual containers with each other by means of assigning association data describing said association into said plurality of virtual containers;*

*indicating for each virtual container a time at which each virtual container was generated relative to other associated virtual containers;*

*inputting said transported data into said payloads of said plurality of virtual containers; and*

*outputting said plurality of associated virtual containers onto a synchronous digital network,*

*wherein data indicating a time at which each virtual container was generated relative to other associated virtual containers is incorporated over several virtual containers by utilizing one or more bits from each successive virtual container of an association of virtual containers*

*and wherein the data indicating a time at which each virtual container was generated relative to other associated virtual containers is incorporated over several virtual containers by utilizing one or more bits from the payload of each successive virtual container of an association of virtual containers.*

*68. A method of transporting data over a synchronous digital network, said method comprising the steps of:*

*generating in parallel a plurality of virtual containers, each at a lower bit rate than bit rate of said data, each said virtual container having a payload section;*

*associating said plurality of virtual containers with each other by means of assigning association data describing said association into said plurality of virtual containers;*

*indicating for each virtual container a time at which each virtual container was generated relative to other associated virtual containers;*

*inputting said transported data into said payloads of said plurality of virtual containers; and*

*outputting said plurality of associated virtual containers onto a synchronous digital network,*

*wherein data indicating a time at which each virtual container was generated relative to other associated virtual containers is incorporated over several virtual containers by utilizing one or more bits from each successive virtual container of an association of virtual containers,*

*and wherein the data indicating a time at which each virtual container was generated relative to other associated virtual containers is incorporated over several virtual containers by utilizing one or more bits from the overhead each successive virtual container of an association of virtual containers.*

* * * * *